United States Patent [19]

Reynolds

[11] Patent Number: 5,400,261
[45] Date of Patent: Mar. 21, 1995

[54] METHOD AND APPARATUS FOR WAVE ANALYSIS AND EVENT RECOGNITION

[75] Inventor: Kentyn Reynolds, Santa Fe, N. Mex.

[73] Assignee: Reynolds Software, Inc., Santa Fe, N. Mex.

[21] Appl. No.: 117,462

[22] Filed: Sep. 7, 1993

Related U.S. Application Data

[63] Continuation of Ser. No. 930,476, Aug. 14, 1992, Pat. No. 5,276,629, which is a continuation of Ser. No. 542,241, Jun. 21, 1990, abandoned.

[51] Int. Cl.$^6$ ............................................. G06F 15/31
[52] U.S. Cl. ................................. 364/487; 324/76.13
[58] Field of Search ............... 364/487, 484, 485, 481, 364/483; 381/41, 42, 43, 45, 48, 49, 50; 382/16, 43; 324/76.13, 76.18, 76.21, 76.33, 76.41

[56] References Cited

U.S. PATENT DOCUMENTS

| | | | |
|---|---|---|---|
| 4,590,605 | 5/1986 | Hataoka et al. | 381/43 |
| 4,593,367 | 6/1986 | Slack et al. | 381/43 X |
| 4,633,748 | 1/1987 | Takashima et al. | 84/616 X |
| 4,739,398 | 4/1988 | Thomas et al. | 382/16 X |
| 4,843,562 | 6/1989 | Kenyon et al. | 381/42 X |
| 4,873,647 | 10/1989 | Banki et al. | 364/487 X |
| 4,905,285 | 2/1990 | Allen et al. | 364/487 X |
| 5,023,912 | 6/1991 | Segawa | 381/43 |
| 5,065,334 | 11/1991 | Taylor | 364/487 X |
| 5,276,629 | 1/1994 | Reynolds | 364/487 |

OTHER PUBLICATIONS

"Waveform Detection and Classification with Saw Cepstrum Analysis," by Jack et al., IEEE Trans. on Aerospace and Electronic Systems, vol. AES-13, No. 6, Nov. 1977, pp. 610-619.
"On the Segmentation and Analysis of Continuous Musical Sound By Digital Computer," by James A. Moorer, Center for Computer Research in Music and Acoustics, May 1975.
Chapter from "Theory and Application of Digital Signal Processing," by L. Rabiner, et al., pp. 356-434 (1975).
"The Bounded-Q Frequency Transform" by K. L. Kashima, Department of Music, Stanford University 1985.
"Techniques for Note Identification in Polyphonic Music" by C. Chafe, et al., Center for Computer Research in Music and Acoustics 1985.
"On the Automatic Transcription of Percusive Music--From Acoustic Signal to High-Level Analysis" by W. Schloss, Department of Music, Standford University 1985.
"Digital Filters and Signal Processing" by Leland B. Jackson, Chapter 6, Sampling Continuous-Time Signals, Chapter 7. Discrete Fourier Transform 1986.
"Intelligent Analysis of Composite Acoustic Signals" by J. Chowning, et al., Department of Music, Stanford University 1986.

Primary Examiner—Michael Zanelli
Attorney, Agent, or Firm—Kenyon & Kenyon

[57] ABSTRACT

A method and apparatus for acquiring, recording, synchronizing, analyzing, and interpreting continuous wave data. A process for isolating separate events from wave data composed of multiple events and for determining the identification and characteristics of an event's wave source, its frequency components, amplitude, duration, and timing. A procedure for defining the parameters of the source wave and for adapting these parameters to the analysis requirements (e.g., correct frequency, amplitude, and timing divisions). A procedure for verifying interpretation results, for correcting interpretation errors, and for retaining successful results. Products of the processes, such as databases and recordings, can be made.

49 Claims, 18 Drawing Sheets

Microfiche Appendix Included
(72 Microfiche, 2 Pages)

CONVERSION (Generate one time strip of a Spectral File)  Figure 3a.
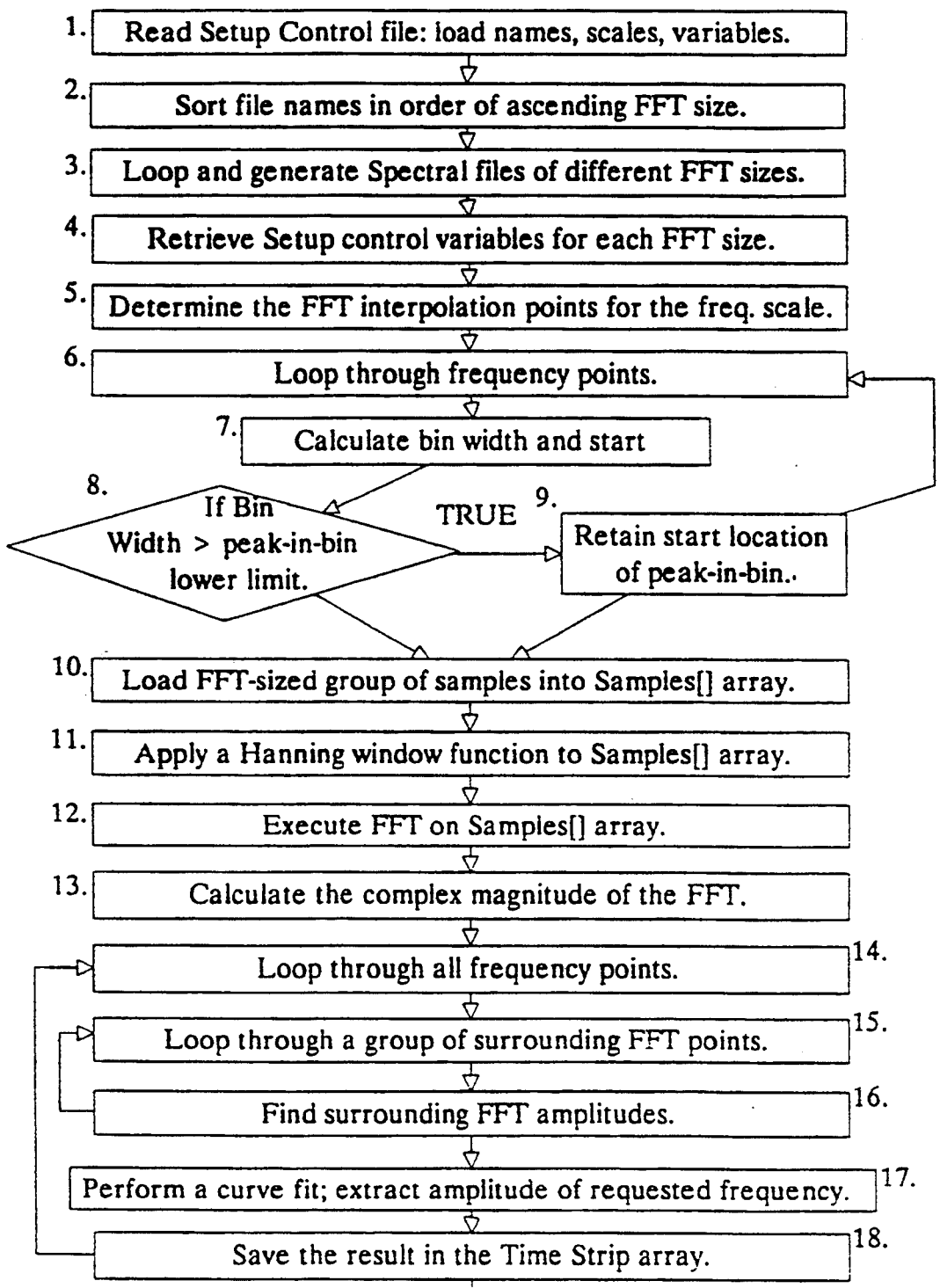

COMPARISON (Initial database generation.)  Figure 4.
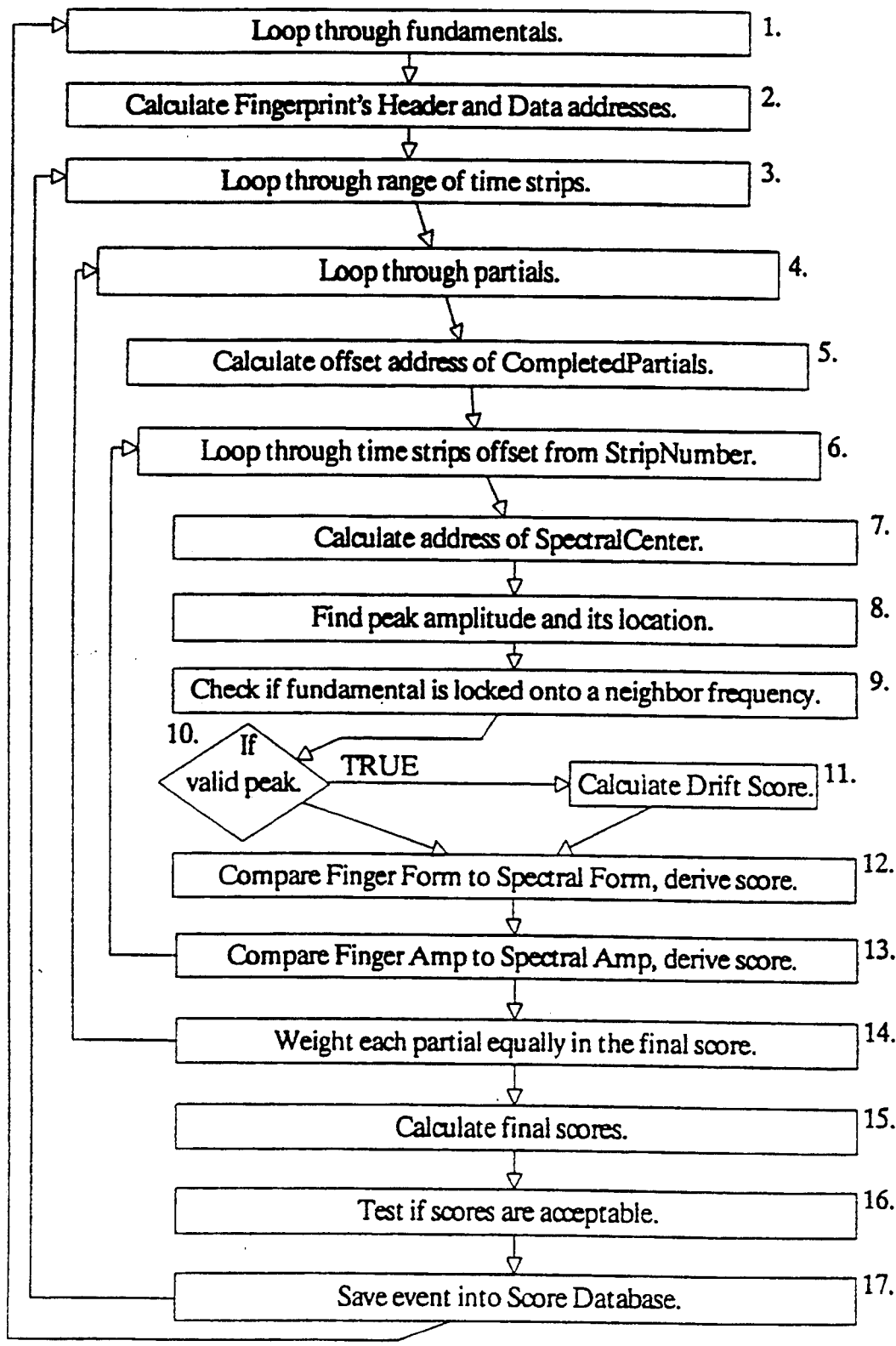

COMPARISON (Time slope compare)  Figure 5.
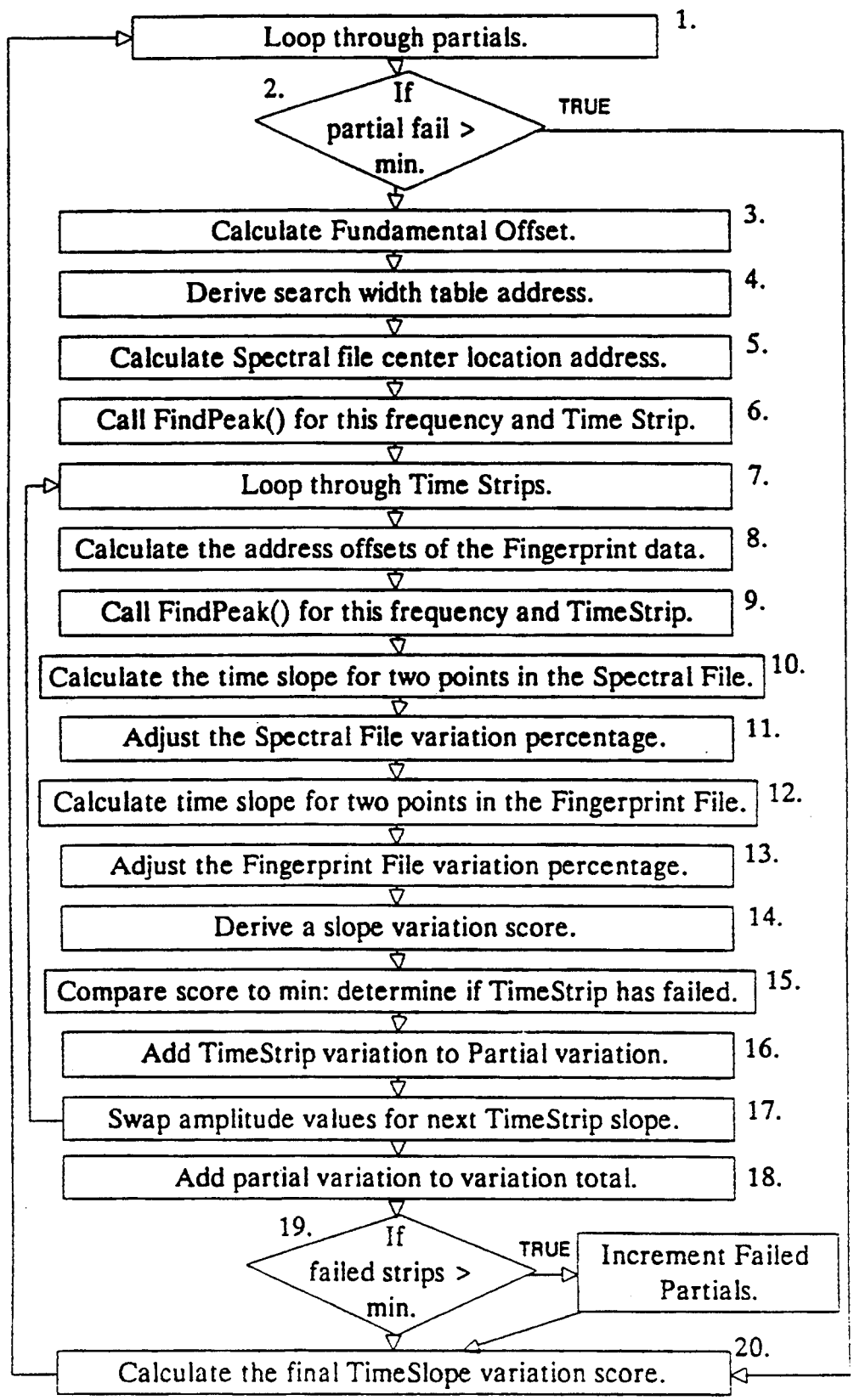

COMPARISON (Frequency distribution width compare)    Figure 6.
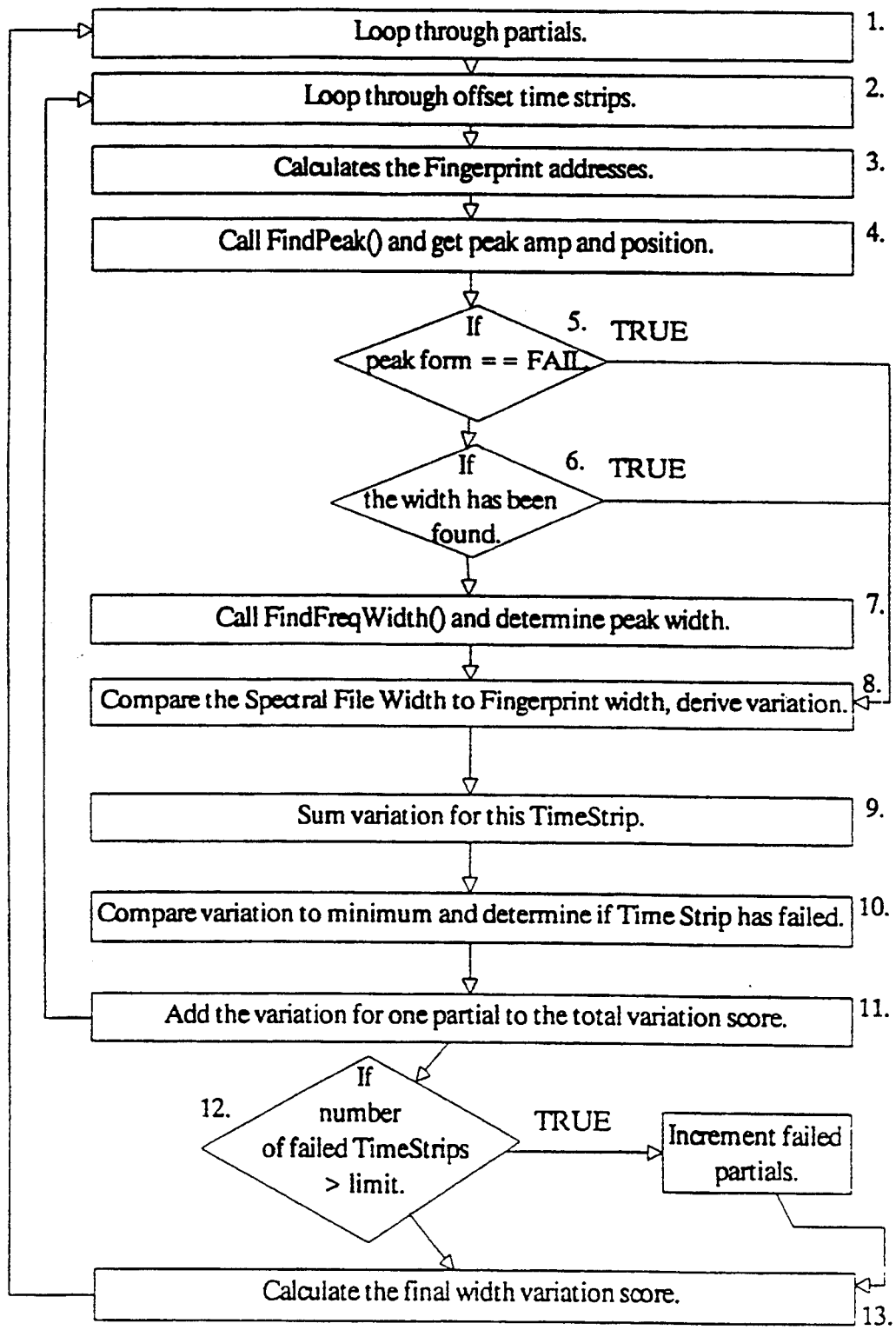

COMPARISON (Find peak)  Figure 7.
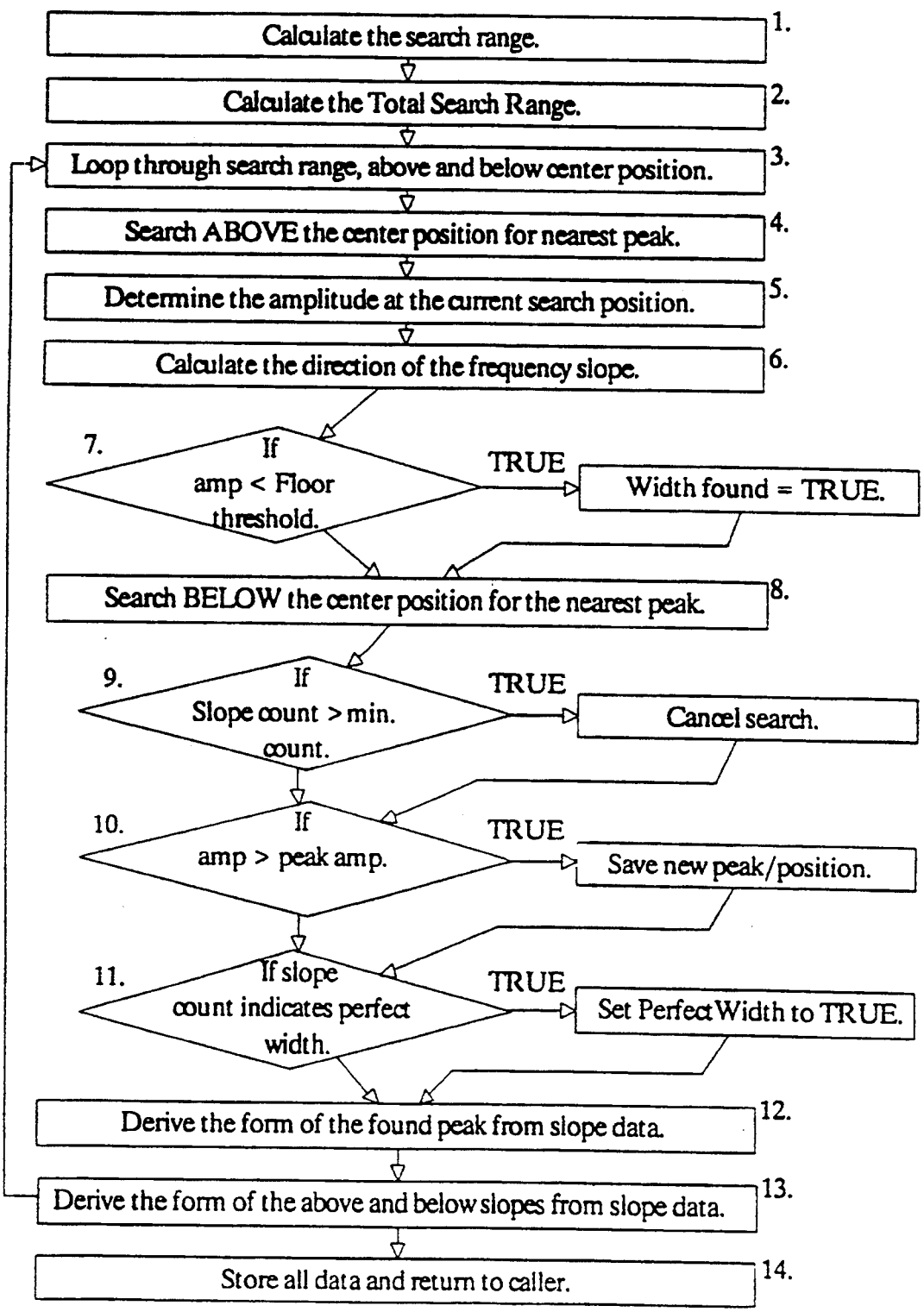

COMPARISON (Find frequency distribution width)

Continued on Figure 8b.

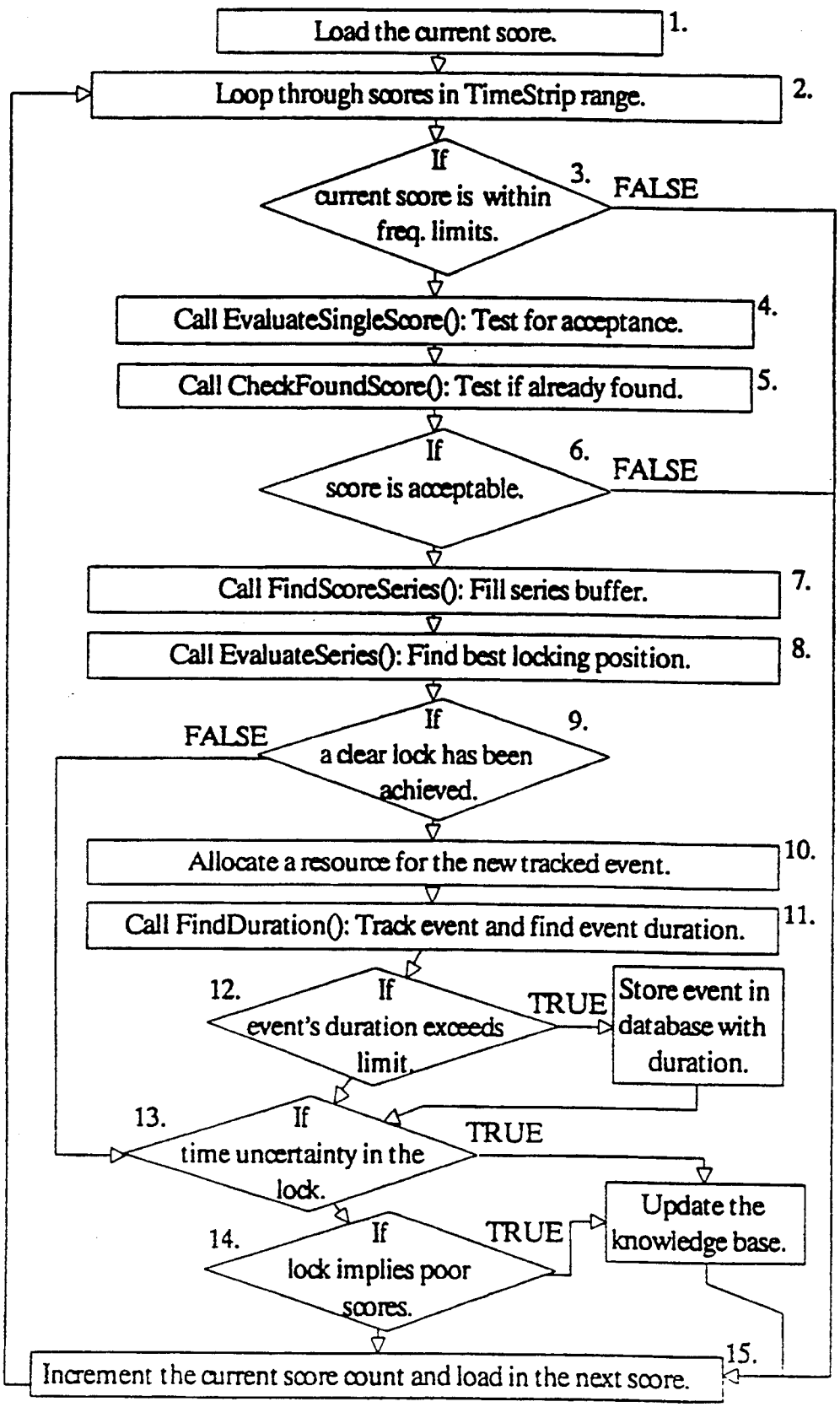
Figure 9. INTERPRETATION (Control the interpretation of scores)

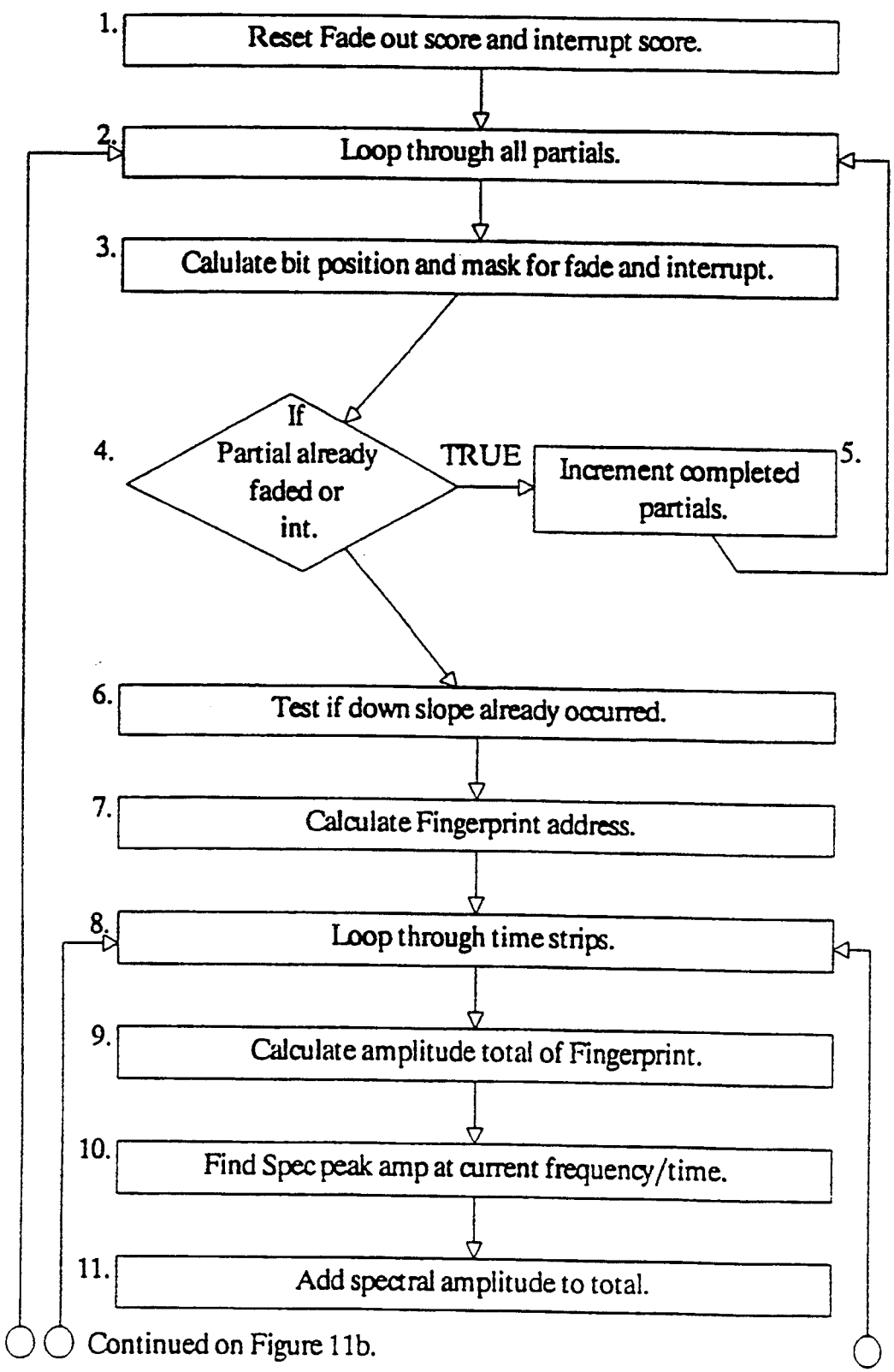
INTERPRETATION (Find the duration of an event)    Figure 11a.
Continued on Figure 11b.

FINGERPRINT (Make Fingerprint)        Figure 12a
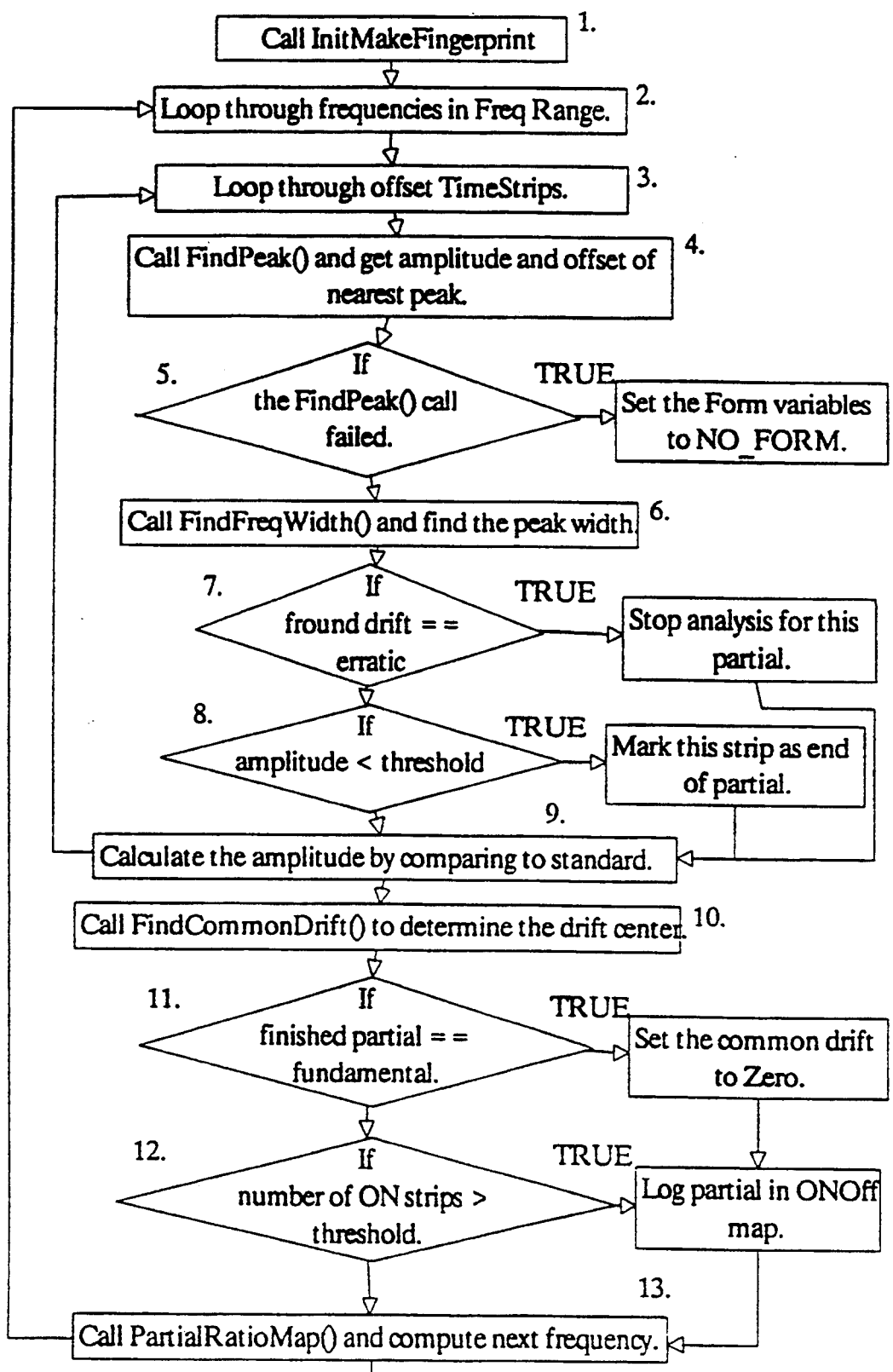
Continued on figure 12b SYNCHRONIZATION (Record file, generate sync table)   Figure 13A
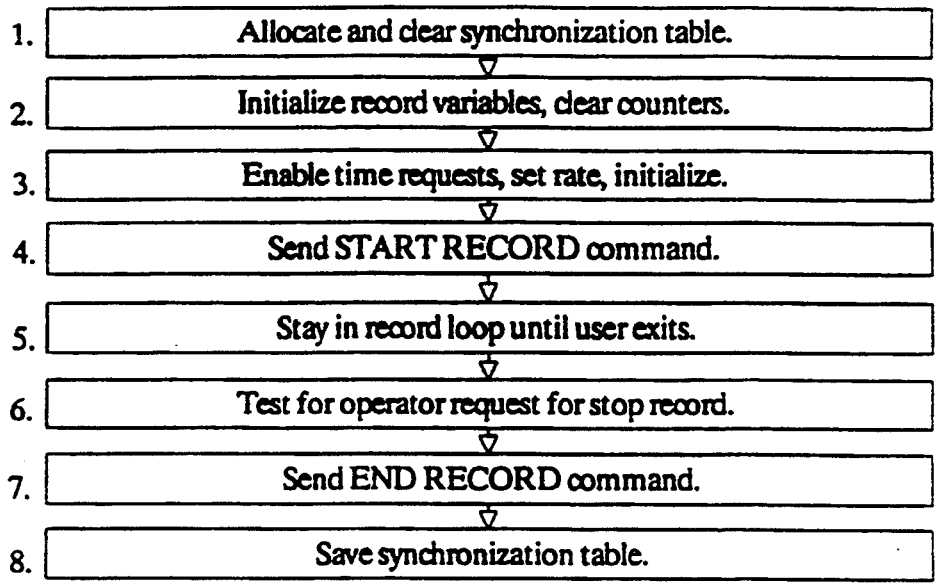
SYNCHRONIZATION (Event time request processing)   Figure 13B
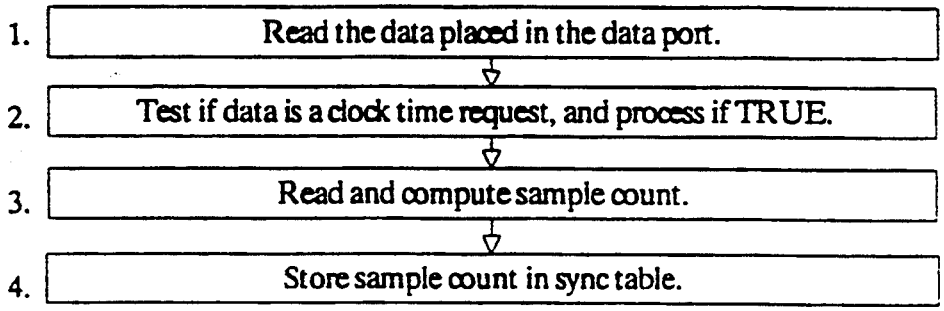
SYNCHRONIZATION (Calculate synchronized time from sync table) Figure 13C
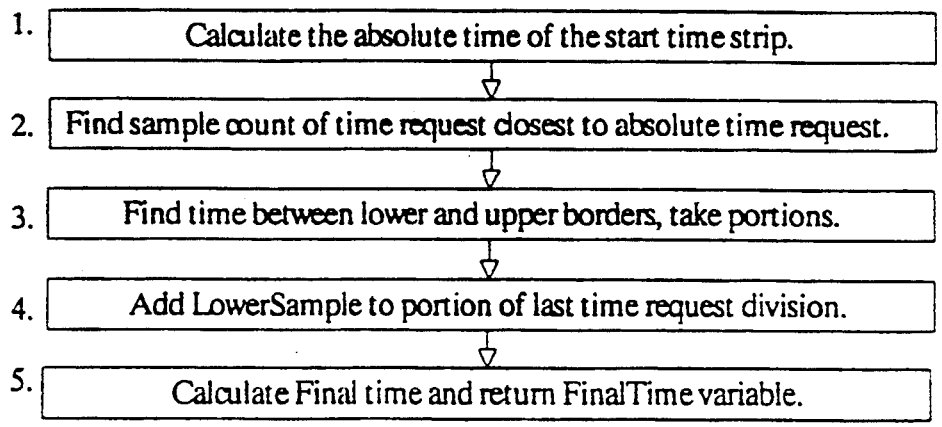

Apparatus Overview

METHOD AND APPARATUS FOR WAVE ANALYSIS AND EVENT RECOGNITION

This application is a continuation of application Ser. No. 07/930,476, filed on Aug. 14, 1992, now U.S. Pat. No. 5,276,629, which in turn is a continuation of application Ser. No. 07/542,241, filed on Jun. 21, 1990 for METHOD AND APPARATUS FOR WAVE ANALYSIS AND EVENT RECOGNITION, now abandoned.

Computer program source code listings with labeled titles and general functional descriptions comprising sequences of instructions, routines, and the like are provided in the microfiche appendix, which is incorporated herein by reference. The program listings in the microfiche appendix are directed to unobvious software utilized in practicing the preferred embodiment of the invention. This software is unique to the invention. Other software used in practicing the invention is either commercially available or within the skill of practitioners in the programming arts. The microfiche appendix consists of 2 sheets of microfiche, each sheet having 70 frames, not all of which have been used.

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The invention relates to analysis of continuous wave data and, more particularly, to a method and apparatus for novel efficient transformation of complex continuous wave data into frequency, amplitude, and time spectral information, unique intelligent pattern recognition, and novel identification of individual events contained within complex continuous wave data.

The need for recognizing and identifying individual events contained within a continuous stream of wave data arises in a broad range of technologies such as the conversion of music into an interactive database of musical events, the recognition of potentially dangerous patterns in a continuous stream of wave data produced by medical monitoring devices, the recognition of specific objects in radar, sonar, laser, and other wave reflections by surveillance or navigational devices, and the like. Event recognition in this context means, in general, the separation and identification of specific wave patterns contained in complex continuous wave data.

Waves are a fundamental means of describing the movement of energy in the physical world. A wave consists of a travelling pattern of energies which fits within a certain distance, or wavelength. The pattern described within a wavelength is a cycle, and a stationary observer perceives the arrival of a repeating wave pattern as a certain number of cycles per second, or frequency. A waveform is defined as one cycle of a wave pattern, There are no theoretical limits to the frequency of a wave pattern, although the limits of current detection apparatus range from ultra low frequency waves (0.001 Hz) to hard cosmic rays (one thousand billion billion Hz). Practitioners in the art will recognize the invention can be applied to any wavelength capable of analysis using state of the art detection and processing equipment.

It is known that a complex waveform can be completely described by its component sinewaves. Complex waves from multiple wave sources can be combined to form even more complex waves containing multiple wave events. In *Digital Filters and Signal Processing*, Kluwer Academic Publishers, Boston, 1986, Leland Jackson describes how waves of related frequencies combine. Component sinewaves of complex waveforms add together, cancel each other, attract each other, and modify each other through interference. Yet despite this complexity of wave combinations, a wave event generated by a particular source usually maintains its own identity, even when combined with many other simultaneous complex waves. The human perception of sound is the best example of this phenomenon. An instrument, such as a flute, is easily distinguished by an average listener from a second instrument, such as a timpani, even though both instruments are played simultaneously. Such human perception of sound waves suggests that separation and identification of waves of many frequencies should be possible.

Consequently, for many years researchers have studied the perception of sound as the quintessential guide toward understanding complex wave analysis and event recognition. Considerable technology exists in the field of acoustic wave analysis, and technology related to spectral analysis and pattern recognition exists in other fields. The use of acoustic wave analysis as illustrated by the preferred embodiment of the invention serves to demonstrate the invention is useful in many fields for spectral analysis and pattern recognition techniques. Since the complexity of acoustic patterns requires attention to a level of detail exceeding the detail required in many other fields, the application of the preferred embodiment to acoustic patterns serves as a comprehensive example of the practice of the invention.

In current practices of analysis of continuous audio data an instrument playing a note is considered a wave source. The notes played by the instrument are considered the individual events. As time progresses forward the notes played produce a continuous stream of complex wave data. The continuous wave data is digitally sampled at precise intervals and the resulting stream of digits is processed by a computer. Most analysis and event recognition techniques try to transform the continuous stream of sampled wave data into frequency, amplitude, and time spectra before attempting any form of pattern recognition. The goals of existing pattern recognition procedures are the identification of the pitch, amplitude, and timing of the note event.

James A. Moorer describes one type of complex continuous wave data analysis in his paper. "On the Segmentation and Analysis of Continuous Musical Sound by Digital Computer", CCRMA, Department of Music, Report No. STAN-M-3. Moorer uses comb filters to preprocess the music wave data and then refines the data with band-pass filters. Moorer relies on harmonic ratios for his preprocessing and pattern recognition procedures and constructs linked lists of all potential notes based on occurrences of events conforming to predetermined harmonic ratios. Moorer places extreme constraints on the structure and instrumentation of the music which can be analyzed since the optimum comb step depends on predictable and stable harmonics at integer harmonic ratios. However, real music rarely has predictable and stable harmonics and does not conform to the compositional constraints imposed by Moorer.

The transformation of digitally sampled data into accurate frequency, amplitude, and time spectra is a difficult and computationally intensive process that has received considerable research. The nature of the difficulty lies in the fact that, for any single analysis step, the more accurate the frequency resolution becomes, the less accurate the time resolution becomes. The reverse condition is equally true. In "The Bounded-Q Frequency Transform", CCRMA, Department of Music, Report No. STAN-M-28, Kyle L. Kashima, et al., present a method of frequency analysis called the Bounded-Q Frequency Transform, which "lowpass-filters" and "sub-samples" input data and applies a Fast Fourier Transform [FFT] to the resulting data for each octave of output desired. Although the effective frequency resolution is good and the computational time is relatively low, the final results distort time to such a degree that the results are not sufficiently accurate, if the timing accuracy of events is important, which it is in music and most other fields.

Other attempts to transform digitally sampled data into frequency, amplitude, and time spectra are described by Lawrence R. Rabiner, et al., in *Theory and Application of Digital Signal Processing*, Prentice-Hall Inc., Englewood Cliffs, N.J., 1975. The use of the FFT with a high degree of overlap is described as veil as the principle of a bank of band-pass filters. Rabiner's work does not recommend a bank of band-pass filters due to the tremendous computation time required. The inherent problem with Rabiner et al's recommended FFT technique is that the frequency spacing is not suited to most analysis needs since output from the FFT is linearly spaced and does not lend itself to more generalized needs.

John Chowning, et al., propose a study of continuous wave analysis and event recognition in their paper, "Intelligent Analysis of Composite Acoustic Signals," CCRMA, Department of Music, Report No. STAN-M-36. They propose using "simulated real-time problem solving heuristics" to determine strategies for allocating resources and controlling feedback loops, and propose a "system learning coprocessor" for parameter adjustment and various forms of pattern recognition. The multi-rate signal processing they propose is a form of the Bounded-Q Frequency Transform. Thus, the proposed system would suffer time distortion. Although this paper was only a proposal for continued funding, it does draw attention to the need for a process that can learn and retain a knowledge base of the facts learned.

In "Techniques for Note Identification in Polyphonic Music," CCRMA, Department of Music, Report No. STAN-M-29, Cris Chafe uses a moving-average technique to identify the beginnings of events prior to application of the Bounded-Q Frequency Transform. Although this technique can work well for some extremely simple forms of music, it does not perform well for dense or complex music. In addition to the weakness of the Bounded-Q Frequency transform Chafe ignores the unstable portion of the note event, thereby failing to utilize a tremendous portion of the vital data.

Clearly, new and more comprehensive method and apparatus for complex continuous wave analysis and event recognition are needed to efficiently transform sampled wave data into frequency, amplitude, and time spectra without substantially distorting frequency or time. The method and apparatus should evaluate all aspects of spectral data without ignoring any portion of the data, despite any instability in the data, as well as readily adapt to a broad range of frequencies, timing, and analysis needs. The invention addresses these needs and provides an efficient solution to these problems.

The major advantages of the present invention are the speed, accuracy, flexibility, and consistency of the conversion of sampled wave data to frequency, amplitude, and time spectra and the extraordinary accuracy and flexibility of its event recognition. In addition, the capacity of the present invention to be configured to meet virtually any frequency and time requirements, as well as virtually any definable recognized wave event, will enable researchers in a broad range of scientific investigation to utilize the invention effectively.

The present invention accomplishes wave analysis and event recognition with a greater degree of efficiency and accuracy than possible with any of the prior art. More specifically, by using the principles of the present invention the conversion of wave data to frequency, amplitude, and time spectra is many times faster and more accurate than by using the best of the prior art. In addition, the invention performs event recognition with a degree of accuracy and flexibility that effectively removes the restrictions imposed by the best attempts of the prior art. Furthermore, the invention is "virtual" in the sense that its frequency scales, time scales, amplitude scales, conversion procedures, pattern recognition procedures, and file structures can be configured for a variety of applications.

SUMMARY OF THE INVENTION

(DISCLOSURE OF THE INVENTION)

In accordance with the invention, there is provided a method for computer automated detection and identification of one or more events from one or more continuous streams of wave data, each event having frequency, amplitude, and time components. The method comprises the steps of transforming a continuous stream of wave data into frequency, amplitude, and time spectral information to minimize computational time and to optimize frequency, amplitude, and time accuracy; extracting identifying characteristics from the spectral information obtained from the continuous stream of wave data; generating and retaining a Fingerprint from the extracted identifying characteristics of a selected known event comprising a source, a time, and a fundamental frequency which are determinable by a user; comparing the identifying characteristics of the Fingerprint to corresponding identifying characteristics extracted from the spectral information obtained from one or more continuous streams of wave data and producing a database of sets of scores describing a level of correspondence between the identifying characteristics of the Fingerprint and corresponding identifying characteristics of a potential event; and selecting from the database sets of scores having a preselected level of correspondence to the identifying characteristics of the Fingerprint and interpreting spectral information associated with the selected sets of scores to determine the presence of a specific event, its start-time, its amplitude, and its duration.

The transforming step can comprise interpreting output of an FFT function to derive amplitudes of selected frequency components using polynomial interpolation; interpreting output of an FFT function to predict an amplitude of a selected frequency component by searching an amplitude peak inside a calculated bin range; providing frequency, amplitude, and time accuracy by combining spectral information produced by a plurality of different length FFT's using frequency limiting; and providing frequency, amplitude, and time accuracy by combining spectral information produced by different length FFT's using amplitude averaging and amplitude clipping.

The extracting identifying characteristics step can comprise extracting amplitude-independent slopes of partials over time; extracting amplitude-independent slopes existing between coterminous partials; extracting amplitude-independent, frequency-distribution widths for partials; extracting amplitude-independent, frequency-distribution width settle-times for partials over time; extracting amplitude-independent, frequency-distribution width forms for partials; determining a frequency position for a most prevalent amplitude peak of a partial and a relative drift of individual amplitude peaks from the most prevalent amplitude peak; and comparing an accumulated total amplitude for all of a plurality of partials for a predetermined number of time positions to an accumulated total amplitude derived from an amplitude reference Fingerprint having a known amplitude level and calculating a resulting relative amplitude level.

The Fingerprint generating and retaining step can comprise generating a Fingerprint from spectral information by extracting the identifying characteristics of the selected known event and retaining at least one of the identifying characteristics, and generating a Fingerprint from more than one selected known event, each having the same fundamental frequency and source, and retaining a set of identifying characteristics which represent an average of at least one of the identifying characteristics.

The comparing step can comprise transposing selected frequency components of the identifying characteristics of the Fingerprint to corresponding frequency criteria of the spectral information; extracting at least one identifying characteristic from spectral information that corresponds to at least one of the identifying characteristics selected from the Fingerprint; comparing the extracted identifying characteristics of the spectral information to the corresponding identifying characteristics of the Fingerprint; and producing a set of scores which reflects the degree of amplitude-independent correspondence.

The selecting and interpreting step comprise determining the presence of a specific event, accumulating a series of scores for a fundamental frequency associated with the specific event, and analyzing a trend of the series of scores over time to determine precisely where in time the specific event begins; further analyzing the series of scores of the specific event to determine if a separate potential event, having partials related to the partials of the specific event, exists within the time covered by the series of scores of the specific event, thereby revealing the possibility of an incorrect interpretation of the series of scores; further accumulating an amplitude for each partial of the specific event for each time location forward in time from the start of the specific event, comparing an accumulated total of the amplitudes of the partials to an amplitude total for partials of the Fingerprint, and calculating a relative amplitude for the specific event; further determining the duration of the specific event by examining the amplitude level of the specific event's partials over time to determine if and when the amplitude level falls below a minimum selected threshold; further determining the duration of the specific event by comparing the amplitude level of each partial of the specific event over time against an average of the amplitudes of the specific event taken at precedent time locations to determine whether a new event has interrupted the duration of the specific event; and further determining the duration of the specific event by testing for a drift of the amplitude peak over time to identify larger drift variations that can follow a predetermined time period of smaller drift variations, thereby indicating that a new event has interrupted the partial of the specific event.

The invention further provides for synchronizing to an external time-base the start-times associated with a plurality of specific events, comprising the steps of generating and storing a table of elapsed sample count for each of a plurality of event timing requests; calculating an event timing request count for the start-time of the specific event and indexing the elapsed sample count table with the event timing request count to retrieve an elapsed sample count; calculating a time offset between the start-time of the specific event and an event timing request time calculated from the event timing request count; using the time offset, further calculating a relative time offset from the elapsed sample count; calculating a synchronized time by adding the elapsed sample count to the relative time offset; and assigning the synchronized time to the specific event.

The invention also provides products produced by these processes, such as databases, representations, and derivatives thereof, audio and visual recordings, and the like.

The invention also provides an apparatus for computer automated detection and identification of one or more events from one or more continuous screams of wave data, each event having frequency, amplitude, and time components. The apparatus comprises structure for transforming a continuous stream of wave data into frequency, amplitude, and time spectral information to minimize computational time and to optimize frequency, amplitude, and time accuracy; structure for extracting identifying characteristics from the spectral information obtained from the continuous stream of wave data; structure for generating and retaining a Fingerprint from the extracted identifying characteristics of a selected known event comprising a source, a time, and a fundamental frequency which are determinable by a user; structure for comparing the identifying characteristics of the Fingerprint to corresponding identifying characteristics extracted from the spectral information obtained from one or more continuous streams of wave data and for producing a database of sets of scores describing a level of correspondence between the identifying characteristics of the Fingerprint and corresponding identifying characteristics of a potential event; and structure for selecting from the database sets of scores having a preselected level of correspondence to the identifying characteristics of the Fingerprint and for interpreting spectral information associated with the selected sets of scores to determine the presence of a specific event, its start-time, its amplitude, and its duration.

The wave data transforming structure can comprise means for interpreting the output of an FFT function to derive amplitudes of selected frequency components using polynomial interpolation; means for interpreting the output of an FFT function to predict an amplitude of a selected frequency component by searching for an amplitude peak inside a calculated bin range; structure for providing frequency, amplitude, and time accuracy by combining spectral information produced by a plurality of different length FFT's using frequency limiting; and structure for providing frequency, amplitude, and time accuracy by combining spectral information produced by different length FFT's using amplitude averaging and amplitude clipping structure.

The identifying characteristics extracting structure can comprise structure for extracting amplitude-independent slopes of partials over time; structure for extracting amplitude-independent slopes existing between coterminous partials; structure for extracting amplitude-independent, frequency-distribution widths for partials; structure for extracting amplitude-independent, frequency-distribution width settle-times for partials over time; structure for extracting amplitude-independent, frequency-distribution width forms for partials; structure for determining a frequency position for a most prevalent amplitude peak of a partial and a relative drift of individual amplitude peaks from the most prevalent amplitude peak; and structure for comparing an accumulated total amplitude for all of a plurality of partials for a predetermined number of time positions to an accumulated total amplitude derived from an amplitude reference Fingerprint having a known amplitude level and structure for calculating a resulting relative amplitude level.

The Fingerprint generating and retaining structure can comprise structure for generating a Fingerprint from spectral information by extracting the identifying characteristics of the selected known event and retaining at least one of the identifying characteristics, and structure for generating a Fingerprint from more than one selected known event, each having the same fundamental frequency and source, and structure for retaining a set of identifying characteristics which represent an average of at least one of the identifying characteristics.

The comparing structure can comprise structure for transposing selected frequency components of the identifying characteristics of the Fingerprint to corresponding frequency criteria of the spectral information; structure for extracting at least one identifying characteristic from the spectral information that corresponds to at least one of the identifying characteristics selected from the Fingerprint; structure for comparing the extracted identifying characteristics of the spectral information to the corresponding identifying characteristics of the Fingerprint; and structure for producing a set of scores which reflects the degree of amplitude-independent correspondence.

The selecting and interpreting structure can comprise structure for determining the presence of a specific event, structure for accumulating a series of scores for a fundamental frequency associated with the specific event, and structure for analyzing the trend of the series of scores over time to determine precisely where in time the specific event begins. Too, structure for further analyzing the series of scores of the specific event to determine if a separate potential event, having partials related to the partials of the specific event, exists within the time covered by the series of scores of the specific event, thereby revealing the possibility of an incorrect interpretation of the series of scores; structure for accumulating an amplitude for each partial of the specific event for each time location forward in time from the start of the specific event; structure for comparing an accumulated total of the amplitudes of the partials to an amplitude total for partials of the Fingerprint, and structure for calculating a relative amplitude for the specific event; structure for determining the duration of the specific event by examining the amplitude level of the specific event's partials over time to determine if and when the amplitude level falls below a minimum selected threshold; structure for determining the duration of the specific event by comparing the amplitude level of each partial of the specific event over time against an average of the amplitudes of the specific event taken at precedent time locations to determine whether a new event has interrupted the duration of the specific event; and structure for determining the duration of the specific event by testing for a drift of the amplitude peak over time to identify larger drift variations that can follow a predetermined time period of smaller drift variations, thereby indicating that a new event has interrupted the partial of the specific event can also be provided.

The invention also provides for synchronizing to an external timebase. The start-times associated with a plurality of specific events. The apparatus comprises structure for generating and storing a table of elapsed sample count for each of a plurality of event timing requests; structure for calculating an event timing request count for the start-time of the specific event and for indexing the elapsed sample count table with the event timing request count to retrieve an elapsed sample count; structure for calculating a time offset between the start-time of the specific event and an event timing request time calculated from the event timing request count; structure for using the time offset to further calculate a relative time offset from the elapsed sample count; structure for calculating a synchronized time by adding the elapsed sample count to the relative time offset; and structure for assigning the calculated synchronized time to the specific event.

The objects, advantages, novel features, and further scope of applicability of the present invention are set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate a preferred embodiment of the present invention and, together with the description, serve to explain the principles of the invention. The drawings are only for the purpose of illustrating a preferred embodiment of the invention and are not to be construed as limiting the invention.

FIGS. 3 through 13c are block diagrams of program structure for the primary procedures. The core functions from each of the primary procedures are shown; in cases where core functions are substantially similar, one is illustrated as representative of the others; each block diagram is titled with the label of its parent procedure and includes a general functional description;

FIGS. 3A and 3B CONVERSION (Generate one time strip of a Spectral File);

FIG. 4 COMPARISON (Initial database generation);

FIG. 5 COMPARISON (Time slope compare);

FIG. 6 COMPARISON (Frequency distribution width compare);

FIG. 7 COMPARISON (Find peak);

FIG. 8 COMPARISON (Find frequency distribution width);

FIG. 9 INTERPRETATION (Control the interpretation of scores);

FIG. 10 INTERPRETATION (Evaluate a series of scores);

FIG. 11 INTERPRETATION (Find the duration of an event);

FIG. 12 FINGERPRINT (Make Fingerprint);

FIG. 13A SYNCHRONIZATION (Record file, generate sync table);

FIG. 13B SYNCHRONIZATION (Event time request processing);

FIG. 13C SYNCHRONIZATION (talc sync time from sync table); and

Figure 1:
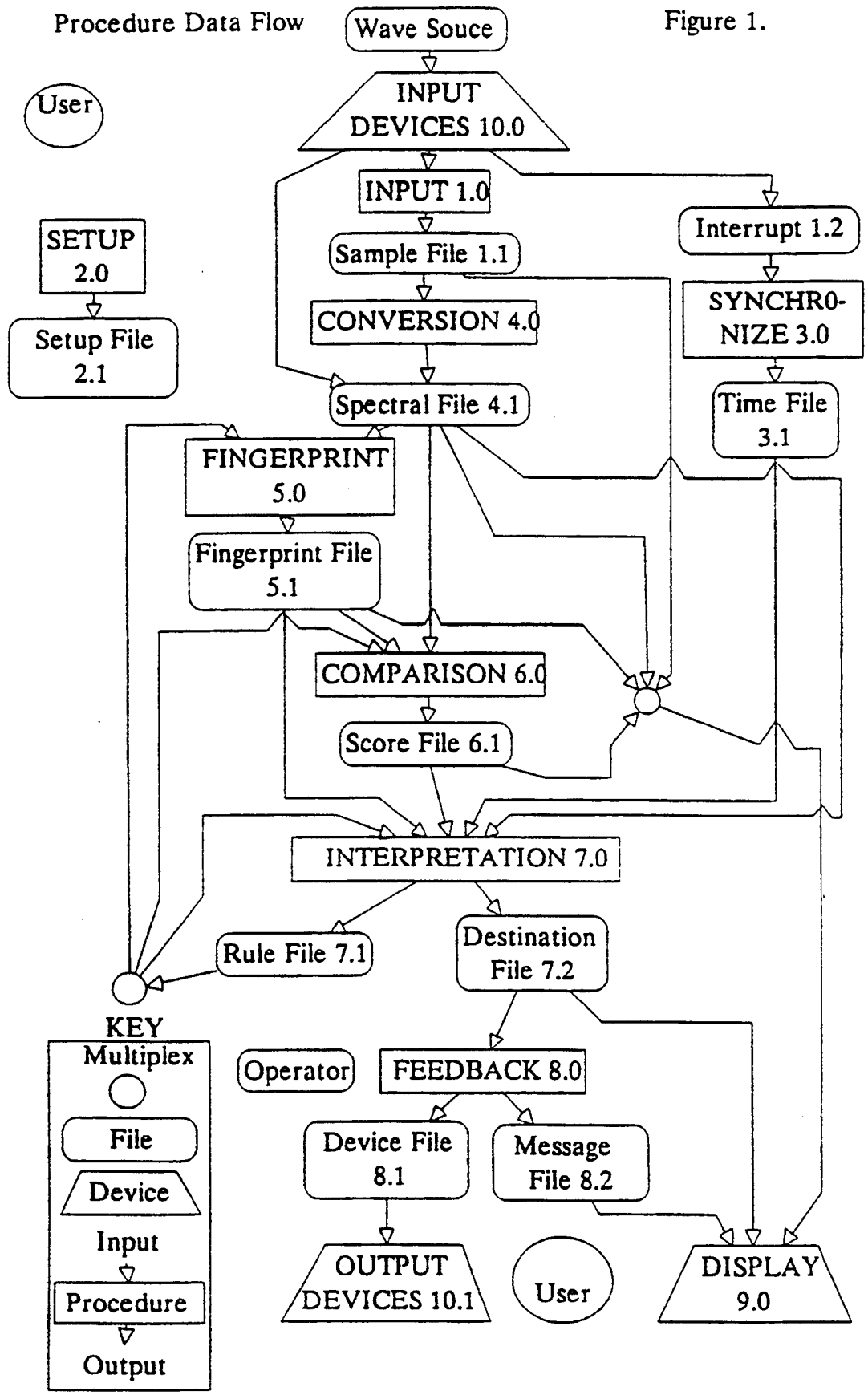
FIG. 1 is a block diagram of the flow of data between procedures.

Relevant program source code with labeled titles and general functional descriptions directly corresponding to the titles and functional descriptions of the block diagrams is provided in the microfiche appendix. Steps represented in the block diagrams are labeled with a number corresponding to a Source Code Listings number. The Source Code Listings are consistent with the standard ANSI C language. The block diagrams provide overviews of process flow while the following discussion and Source Code Listings disclose in detail processes involved in the invention;

DETAILED DESCRIPTION OF A PREFERRED EMBODIMENT OF THE INVENTION (BEST MODE FOR CARRYING OUT THE INVENTION)

To understand the operation of the invention on complex waves, the nature of the vibrating source responsible for generating the wave, as well as the receiving and filtering processes, is examined.

As a preliminary step, the signal containing the wave data is digitally sampled at a rate allowing the highest desired frequency to be represented by at least two samples. The samples are processed in small groups of contiguous samples called "time strips". Each time strip corresponds to a specific duration of time.

Before a vibrating source begins emitting waves it is at rest and must be excited by a force. A vibrating source responds to an exciting force with a unique pattern of chaotic frequencies settling toward a resonant frequency. At the start of this excitation the vibrating source is unstable and generates many frequencies for a brief time. As the excitation continues, the chaotic frequencies begin to group and emphasize a "peak" frequency. At first the peaks tend to "drift" in frequency, but they eventually settle on a resonant frequency. The duration from excitation to settle point is called the "settle time."

Normally the settle time extends across several time strips. When a time strip contains a wave which is settling, many frequencies that are distributed between frequency limits occur (these limits being defined by a low and a high frequency point). The width of this frequency distribution is referred as the "frequency distribution width". The shape of the frequency distribution width can be analyzed to produce a frequency "width form". A pattern emerges as the frequency distribution width, width form, and its associated peaks progress through multiple time strips toward a settle point.

Frequently, complex waves are composed of mathematically related sine waves, which are referred to as "partials." Partials of different frequencies share a common "fundamental" frequency (the fundamental is also considered one of the partials). Adjacent partials sharing the same fundamental are referred to as "coterminous partials". Harmonics are one example of partials. Each partial has its own settle time, frequency distribution width, width form, and peak drift, The individual partial's amplitude curve is defined as the "time slope". The amplitude relationship between coterminous partials is defined as the "frequency slope". Time slope and frequency slope provide identifying information when extracted and used in practicing the invention.

In order to analyze the digitally sampled wave the user configures the invention with a lower and upper frequency limit suitable to the wave data, and then selects appropriate filtering methods in order to divide the specified frequency range into discrete frequency steps. Each filter is centered on a specific frequency. A filter's purpose is to provide the amplitude of the filter's center frequency for a specific time strip. One or more cycles of a wave must elapse before a filter can state the amplitude of its center frequency with any certainly. From the point of time a wave enters a filter up to the point of time one cycle has elapsed, the filter output is, of course, in error and results in increased "filter uncertainty width" and incorrect amplitude values.

Filters suffer from an additional phenomenon known as "leakage." Since no filter is sufficiently narrow to separate out a single frequency from a complex wave, all filters allow some portion of the neighboring frequencies to leak through. This leakage can lead to false interpretations of a filter's output if the leakage is not calculated and the resulting error factor recognized.

In practicing the invention one takes into account the nature of vibrating sources and their resulting waves as well as the errors introduced by the receiving and filtering steps. The waves' partial ratios and amplitude slopes provide a tremendous amount of analysis data, but not enough detail to draw unequivocal conclusions about the characteristics of the vibrating source. The frequency distribution widths, width forms, peaks, settle times, and corresponding progressions across time provide the additional data necessary for the invention to achieve its extraordinary accuracy. Since these characteristics are applicable for any frequency, the invention can be practiced utilizing events comprising virtually any frequencies.

The invention extracts the location in time that an event occurs and identifies the signal source, its fundamental frequency, amplitude, and duration. In order to extract this information a wave whose attributes are known is first analyzed and stored along with its known attributes as a "Fingerprint File." The invention then compares a Fingerprint of a known fundamental frequency to a source wave by transposing the Fingerprint's frequency components to match the fundamental frequency of the source wave. Frequency ratios, amplitude ratios, frequency distribution widths, width forms, peaks, and settle times (i.e., "Fingerprint attributes") are taken from the Fingerprint and compared to the same attributes of the source wave. Each comparison generates a "set of scores" which is stored in a "Score File" for subsequent interpretation.

The Score File is processed through a statistical collection procedure which calculates the distribution of score density patterns. From these score patterns a user selects a range of scores to be examined based on the density patterns observed.

The results of previous interpretations establish tractable rules whereby the invention "learns" how to interpret better a specific progression and relationship of scores. If the invention's interpretation rules determine that an event is questionable, then it initiates a series of feedback steps so that the user may assist in the invention's learning. Once an event is identified, its duration and evolution are tracked by the invention until the event is over.

At any point during score generation or score scanning a pre-defined message may be sent to the user. Messages are sent based on critical threshold conditions which are selected and established by a user during Setup. These messages serve as warning flags or indicate a need for user intervention.

The invention is also directed to products produced by the processes of the invention. Such products include but are not limited to databases, representations, and derivatives thereof, audio recordings, video recordings, and the like.

Although the preferred embodiment is generally addressed to acoustic wave processing by way of example, those skilled in the art will appreciate that the invention will be useful for processing waves of virtually any frequency contemplated for analysis. The particular designs and modifications for embodiments suitable for particular frequency ranges will be apparent to those skilled in the art from the teachings of the invention. Many of the various designs used by practitioners to analyze different frequency ranges will be a matter of choice in accordance with the invention.

Figure 2:
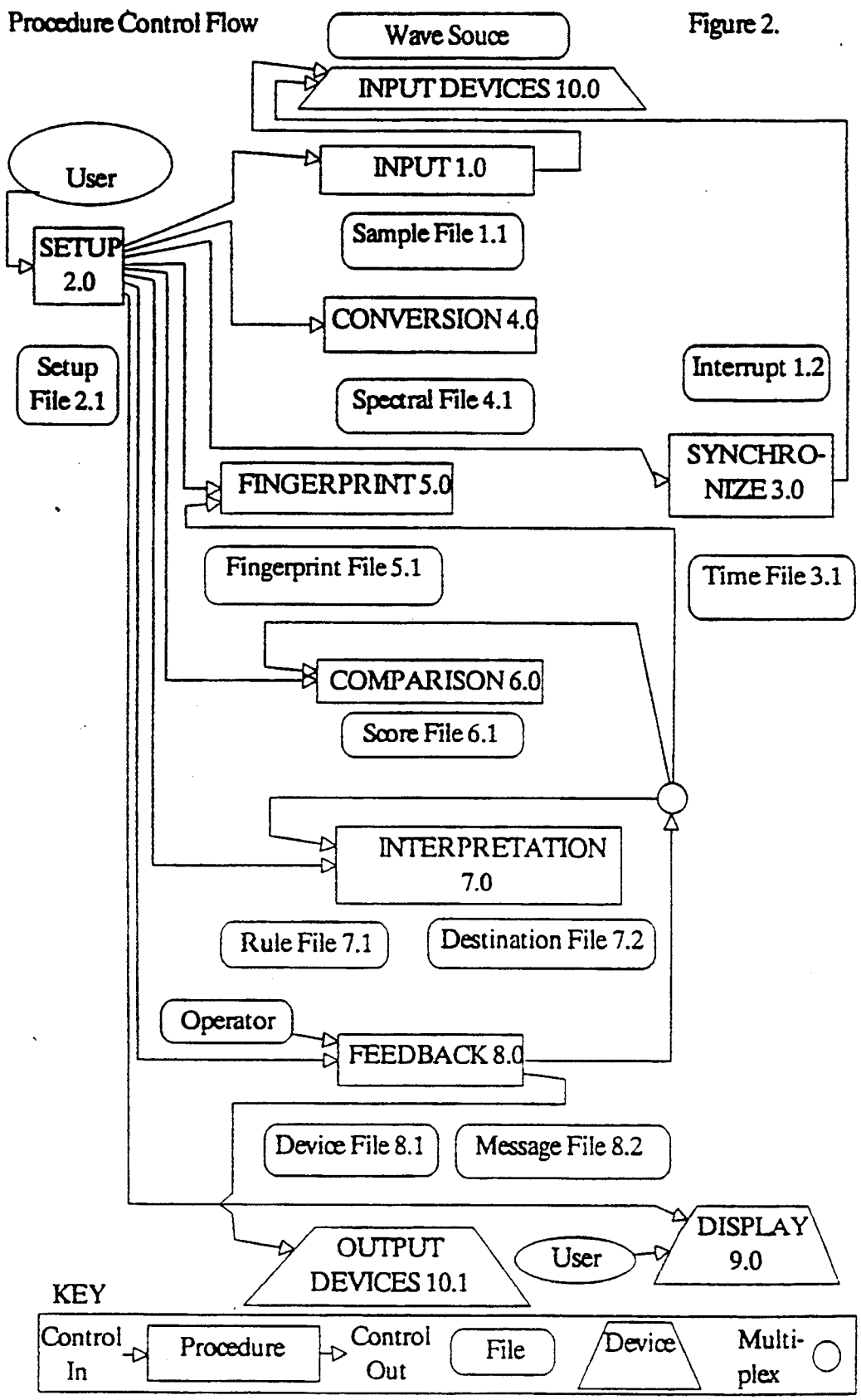
FIG. 2 is a block diagram of the flow of control between procedures.

FIG. 1 (PROCEDURE DATA FLOW) and FIG. 2 (PROCEDURE CONTROL FLOW) are block diagrams of the procedures, data files, and devices and of the subsequent flow of control information and pertinent data files. One first defines the input and output devices and configures the procedures and file structures to the appropriate values.

FIG. 1. and FIG. 2 INPUT DEVICES (10.0):

"INPUT DEVICES" refers to (a) the devices to digitize the source wave and to time-correlate an external high resolution clock to the sampling process and (b) the device controls used by the invention uses to control the sampling process. In many applications an analog-to-digital converter discretely samples an incoming source wave at a specific rate. INPUT DEVICES are also used to time-correlate the high-resolution clock to the sampling process. Typically this device counts or reads elapsed time and generates an "event timing request" used by the SYNCHRONIZE (3.0) procedures. The INPUT DEVICES are controlled by the invention's "start sampling", "stop sampling", and "inquire elapsed samples" commands.

FIG. 1. and FIG. 2 INPUT (1.0):

"INPUT" refers to the procedures which control the recording of samples from the INPUT DEVICES. A Sample File is a continuous digital recording of the source wave. Recording of the source wave is not always necessary since an apparatus in accordance with the invention can be configured to process previously recorded continuous wave source data.

FIG. 1. and FIG. 2 SETUP (2.0):

The user selects tee configuration parameters for SETUP in order to specify how the invention displays, processes, compares, stores, verifies, and interprets the source wave and resulting files. The capabilities of the INPUT DEVICES determine the lowest and highest frequencies and amplitudes to be processed. These frequency and amplitude ranges are divided into smaller frequency and amplitude divisions by overlaying a user-defined frequency scale. The sample rate of the selected input device determines the smallest division of time that can be processed. The user can select for display or for processing any division of time as small as the duration of one sample.

Most of the invention's files can be visually displayed on the DISPLAY (9.0) VDU terminal. The user controls which portions of the frequency range and time divisions are displayed. All step and control parameters for all procedures are defined in SETUP (2.0) and stored in the Setup File (2.1).

Each procedure receives input or control information from a wave source, a user, or a file produced by a previous procedure. Each procedure produces a file or controls the output of information from the invention.

FIG. 1. and FIG. 2 CONVERSION (4.0):

"CONVERSION" refers to the production of a Spectral File (4.1) from a Sample File (1.1) input. The invention can accept file input which is already in spectral form, or it can generate Spectral Files (4.1) through the use of external band-pass filters, or it can use a novel adaptation and interpretation of the Fast Fourier Transform (FFT), the "Interpolated FFT Filter Bank". The goal of filtering is to produce a Spectral File (4.1) with accurate frequency and time resolution for further processing. SETUP (2.0) defines the filtering process to be used. In most cases the user selects the invention's Interpolated FFT Filter Bank since it is significantly faster and more accurate than other filtering.

The invention uses a relatively small number of sample points for the FFT if the frequency is high and a relatively large number of sample points for the FFT if the frequency is low. The results from these multiple FFTs are combined by a series of frequency-limiting and amplitude averaging and clipping procedures, called the "Multi-Pass Procedure". Frequency-limiting defines the optimal frequency range for the different length FFTs ("length" being a measure of the number of sample points). The amplitude averaging and clipping procedures process the shorter length FFTs by averaging individual amplitudes with corresponding amplitudes from the longer length FFTs and clipping the resulting averaged amplitude so It doesn't exceed the calculated amplitude levels taken from the shorter length FFTs.

An FFT produces a graph of amplitude values linearly spaced across a frequency range. Upon this linear scale the user can define and then overlay virtually any conceivable frequency scale. The individual frequencies contained in the user-defined frequency scale and the individual frequencies the FFT produces are referred to as "points" The invention finds a series of FFT points which surround the desired frequency scale point and performs a curve-fit, using polynomial interpolation on these FFT points. The desired frequency point is then interpolated from the curve-fitted FFT points.

In the higher frequency ranges an FFT produces multiple points for each requested point in the user-defined frequency scale. The invention analyzes the number of multiple points per requested point, calculates the "bin range", a search range above and below the requested point, and scans this bin range to find a maximum amplitude peak, which is referred to as the "peak-in-bin".

The final Spectral File (4.1) is passed to both the COMPARISON (6.0) and FINGERPRINT (5.0) procedures for further processing (see below).

FIG. 1. and FIG. 2 SYNCHRONIZE (3.0):

"SYNCHRONIZE" refers to the accurate time alignment of timing data when the invention collects and examines multiple sources of waves.

The invention is often required to synchronize to a common "external time-base" the wave data that are acquired at different times and perhaps from different locations. The external time-base is generated from a high resolution clock generator/reader capable of precise timing divisions. This clock generator or reader should be capable of generating an event timing request to which the SYNCHRONIZE (3.0) procedures can respond. The input sampling device should be capable of responding to a "start" command, a "stop" command, and an "elapsed sample inquiry" request.

The novel synchronization procedures begin simultaneously with the "start" command. Upon receiving an event timing request from the INPUT device the synchronization procedures obtain the elapsed number of samples, "elapsed sample count", from the INPUT device and accumulate a count of the event timing requests and associated elapsed samples in the Time File (3.1). This file is passed to the INTERPRETATION (7.0) procedures which index, read, and interpret timing information from the Time File in order to calculate the correct timing information for the Destination File (7.2).

FIG. 1. and FIG. 2 FINGERPRINT (5.0):

"FINGERPRINT" refers to the generation of a known set of facts about an event extracted from a Spectral File (4.1). The FINGERPRINT procedures take a Spectral File of a source wave from a known vibrational source and calculate, extract, and store (in the Fingerprint File) the Spectral File's frequency and amplitude slope ratios, peak locations, settle times, frequency distribution widths, and width forms. The FINGERPRINT procedures calculate a Fingerprint amplitude level by summing the individual associated partial amplitudes and then comparing this amplitude total to the amplitude total of a previously stored Fingerprint, the "amplitude reference Fingerprint", which has been generated from a known event with a known amplitude. The Fingerprint amplitude level and the information identifying the vibration source and fundamental frequency are then stored in the Fingerprint File.

Once an initial Fingerprint File (5.1) is produced by the FINGERPRINT procedures the FEEDBACK (8.0) procedures automatically modify and evolve new Fingerprints based on the parameters of the initial Fingerprint File. The Fingerprint File is than passed to the COMPARISON (6.0) and INTERPRET (7.0) procedures for further processing (see below).

FIG. 1. and FIG. 2 COMPARISON (6.0):

"COMPARISON" refers to the unique evaluation of differences and similarities between the attributes of the Fingerprint File (5.1) and the Spectral File (4.1). The COMPARISON procedures yield a unique score for each attribute of the Fingerprint File.

The Spectral File (4.1) is stored as a series of time strips with each strip containing the amplitudes of the defined frequency scale. COMPARISON procedures step through each of the Spectral File's frequency points and compares the spectral information to the comparable attributes stored in the Fingerprint File, and then proceed to the next time strip, repeating the process until the entire file is processed. The Fingerprint File is indexed by the specific frequency point (in the Spectral File) that is under examination, and a single Fingerprint is extracted and transposed to meet the requirements of the specific Spectral File frequency point. The Spectral File is scanned starting from the point under examination, and the collected frequency and amplitude values are converted to a format matching the format of the Fingerprint File. Then the converted Spectral File information is compared against the Fingerprint's corresponding attributes, and a set of scores is generated from the results and stored in the Score File.

FIG. 1. and FIG. 2 INTERPRETATION (7.0):

"INTERPRETATION" refers to the novel process of evaluating the individual scores from the Score File (6.1) and reaching conclusions about the attributes and behavior of each event recognized in the source wave. INTERPRETATION procedures search for scores which indicate that a potential event is starting and then gather a "series of scores" related to the potential event's fundamental frequency from time strips both before and after the time strip associated with the potential event. INTERPRETATION of the series of scores is controlled by tractable rules which determine the meaning assigned to specific sequences and relationships of scores. Once the INTERPRETATION procedures determine an event has started and when, i.e., its "start-time", they then calculate amplitude and crack the event's duration.

The INTERPRETATION procedures contain utilities to scan the Score File (6.1) and gather statistics about the distribution of scores. The user can display these distribution graphs and select a range of scores to examine. Through a set of interactive procedures the user can dynamically modify and add rules and conditions to the Rule File (7.1) pertinent to the data being analyzed.

In turn, INTERPRETATION's "feedback" procedures inform the user of questionable conditions arising from application of these rules to the data. Thus, the evolving "knowledge base" contained in the Rule File, in conjunction with the score ranges, comprises a set of rules that govern the INTERPRETATION, FINGERPRINT, and COMPARISON procedures. These rules are stored and available to the user for future use.

INTERPRETATION's "duration tracking" procedures lock onto the event's partials and track the event until new events completely interrupt all partials or a minimum amplitude threshold is crossed.

INTERPRETATION's "amplitude extraction" procedures also lock onto the partials and compare the amplitude levels of the Spectral File's partials to the amplitude levels of the Fingerprint's partials. When the current event is finished, the collected amplitude data are compared to the Fingerprint's amplitude setting, and an event's "relative amplitude" is determined.

INTERPRETATION creates a Destination File (7.1) which is a database of conclusions made by its procedures. This file is then accessed by FEEDBACK (8.0) which sequences the results for the user verify.

Furthermore, the flow of output from the INTERPRETATION to the FEEDBACK (8.0) procedures is controlled by SETUP (2.0) or the user so that nay Fingerprints can be generated if comparison averages fall below an established threshold.

FIG. 1. and FIG. 2 FEEDBACK (8.0):

"FEEDBACK" refers to the procedures which present results from previous procedures to the user for verification. In turn, the user specifies the conditions under which FEEDBACK is activated. FEEDBACK reads the appropriate portions of the Destination File (7.2) and converts them to the format appropriate for DISPLAY (9.0) and OUTPUT DEVICES (10.1). FEEDBACK also controls the distribution of the Device Files (8.1) and Message Files (8.2) to the appropriate procedures. FEEDBACK procedures receive responses from the user and, in turn, control FINGERPRINT (5.0), CONVERSION (4.0), COMPARISON (6.0), and INTERPRETATION (7.0) for the purpose of regenerating more accurate files. FEEDBACK also controls the generation and evolution of Rule Files (7.1).

FIG. 1. and FIG. 2 OUTPUT DEVICES (10.1):

"OUTPUT DEVICES" refer to the selected devices used by the FEEDBACK (8.0) procedures to verify results. Different applications use different devices since the frequency requirements of these applications vary and the means of presenting results necessarily differ. In principle the OUTPUT DEVICES should be capable of receiving a file to be played or displayed and should include the controls to position, start, and stop the output of the Device Files (8.1).

FIGS. 3A-13C.

(PROCEDURES)

The DESCRIPTION OF PROCEDURES section (below) further describes the essential processes involved in the key procedures: namely, CONVERSION 4.0, FINGERPRINT 5.0, COMPARISON 6.0, INTERPRETATION 7.0, and SYNCHRONIZATION 3.0. Since all other procedures cover ancillary functions for controlling particular device configurations, data flow, and information display, these other procedures are not described in detail.

FIG. 14 APPARATUS OVERVIEW

The individual components of an exemplary apparatus in accordance with the invention generally comprise a device for converting, such as A/D Converter 3, continuous wave data from a wave source 1 into discrete digital samples which are processed by a computer 6 and associated coprocessors 7, if any. The results are sent from the computer 6 to the D/A Converter 3, a graphics card and monitor 9, and into storage 10. Alternatively, a direct digital input 5, can enter wave data directly into the computer 6 without utilizing an A/D converter. A clock 2 can generate and read high speed timing information and signal the computer to respond to timing information by controlling a timing request generator 4, which in turn controls the computer.

For acoustical wave analysis, the wave source i may be, for example, a multi-track tape recorder capable of processing tape having several tracks of audio signal, as well as an SMPTE time track. The audio signal is fed from the tape recorder into the analog-to-digital converter 3, which may be, for example, an ARIEL TM DSP-16, which generates digital samples to be read by the computer 6, which may be, for example an IBM ® or compatible PC 33MHz 80386 computer system, functioning under an operating system, such as MS-DOS ® 3.3. The computer system stores the digital samples on a storage device 10, which may be, for example, a hard disk drive. As stated previously, the A/D converter may be bypassed by using a direct digital input device 5, such as an AES EBU compatible input port. The processing power of the computer may be supplemented by coprocessors 7, such as an Eighteen Eight Laboratories PL1250 floating-point array coprocessor, and by a multi-tasking operating system, such as MICROSOFT ® Windows 3.0. The computer system generates signals to the graphics card and monitor 9, such as a VIDEO SEVEN TM 1024 X 768 high-resolution VGA video adapter and a NEC multisync high-resolution color monitor. The computer system sends digital samples to the D/A converter 3, such as the ARIEL TM DSP-16. The high speed clock generator/reader 2, which may be for example a Roland SBX-80 SMPTE synchronizer, reads the SMPTE time code from the tape recorder and controls the timing request generator 4, which may be for example a Roland MPU-401 MIDI interface, directly interfaced to the computer. The user controls the apparatus through commands entered through the computer keyboard 8.

DESCRIPTION OF PROCEDURES

Figure 3B:
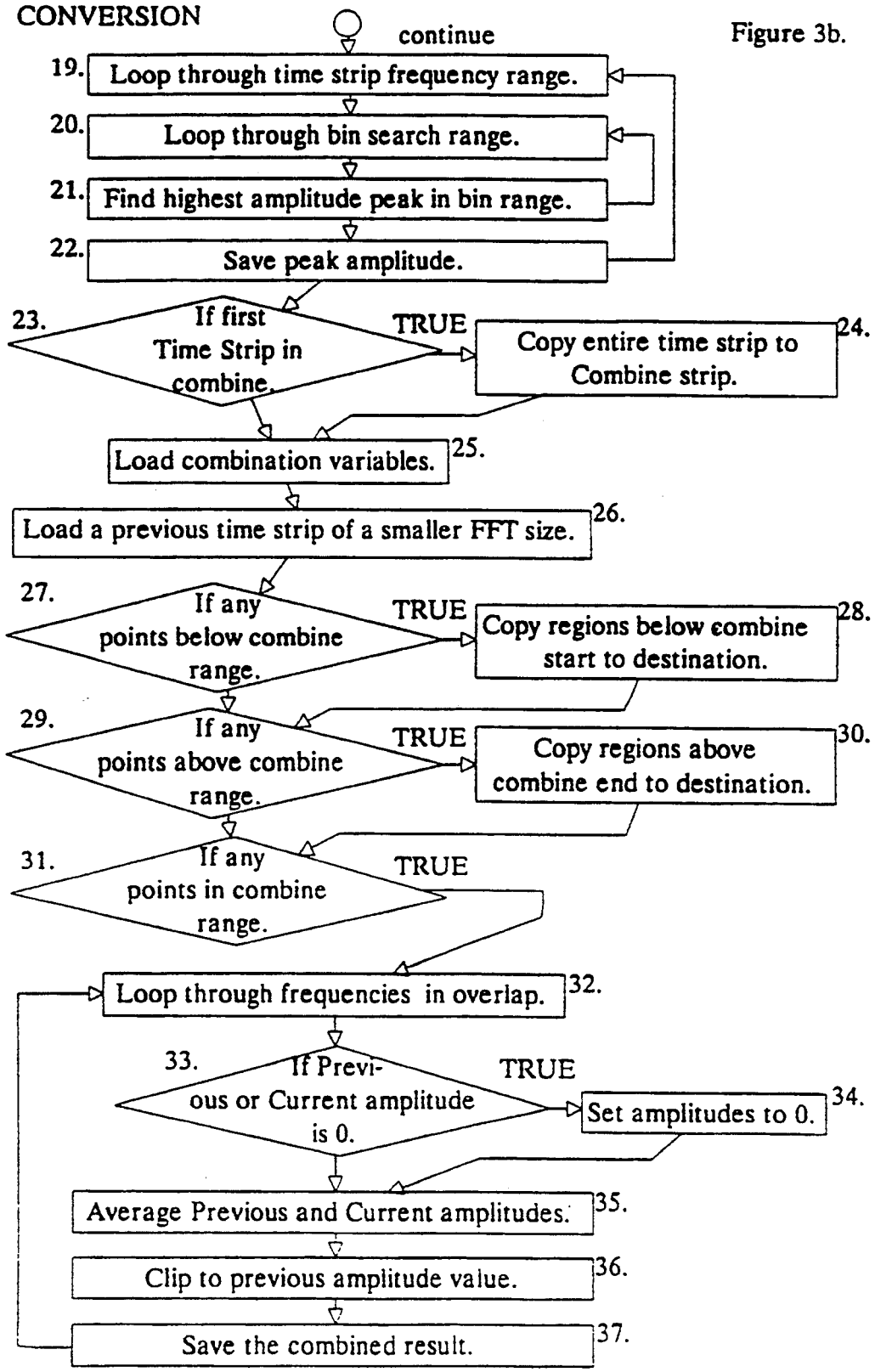

CONVERSION (Concrete one time strip of a Spectral File)
NAME: Multi PassSpectral( )
FIGS. 3A and 3B This procedure novelly generates multiple Spectral time strips of varying time and frequency qualities and then uniquely combines them into a single spectral time strip. To describe the process the program source code illustrates spectral generation for a single time strip. Typically, a Spectral File is composed of many time strips.

1. Reads the Setup File in order to extract the control parameters, frequency scales, and file names required by the Conversion procedures.
2. Sorts the file names in order of ascending FFT size to place the smaller FFT-sized Spectral time strips at the beginning of the subsequent spectral-combine procedures.
3. Begins the loop for controlling the generation of multiple Spectral time strips of different FFT sizes.
4. Accesses the Setup File to retrieve variables specific to the FFT size used in the generation of the current Spectral time strip.
5. Overlays the frequency scale requested by the user upon the FFT's frequency points and calculates floating point locations to determine the positions in the FFT at which the requested frequency scale points are to be extracted by subsequent procedures. The results of an FFT may be viewed as a series of amplitudes at specific frequency points. However, the application of FFTs inherently produces too few frequency points in the lower frequencies for adequate interpretation and so many frequency points in the higher frequencies that accurate selection is problematic. The invention's "polynomial interpolation" function novelly compensates for the lack of points in the lower frequencies, and its "peak-in-bin" function uniquely compensates for the excessive points in the higher frequencies.
9. Calculates the peak-in-bin tables to be used by subsequent procedures. Peak-in-bin procedures take the requested frequency scale point, find the closest FFT frequency point, and search the surrounding FFT frequency points (i.e., the "bin range") for the highest amplitude level.
6. Loops through all frequencies in the requested frequency scale.
7. Calculates and stores the bin-width and bin-width start locations for each requested frequency scale point.
8–9. Tests whether the bin-width is greater than a minimum bin-width requirement, and, if so, retains the frequency location at which to start peak-in-bin searching.
10. Loads a group of contiguous samples of a specific length derived from the Setup procedures into an array for FFT processing.
11. Applies an apodizing function to the sample array to reduce FFT analysis errors that occur at the edges of sample windows (a Hanning window is shown for illustration).
12. Performs an FFT of the requested size on the sample array.
13. Calculates the complex magnitude for each pair of real and imaginary parts contained in the FFT.
14–18. Performs a polynomial interpolation on the current time strip. Polynomial interpolation uses the InterpArray[] calculated in block 5 (above) to determine the exact position in the FFT to derive the individual amplitudes. The resulting amplitudes are placed in the TimeStrip array.
   14. Loops through all frequency points in the requested frequency scale.
   15–16. Loops through the surrounding FFT points at a width equal to the requirements of the curve-fitting procedure and collects the amplitudes.
   17. Performs a Chi-squared orthogonal polynomial curve fit on the collected amplitudes and extracts the amplitude at the requested frequency offset position.
   18. Saves the resulting amplitude value in the TimeStrip array.
19–22. Performs the peak-in-bin function on the current time strip.
   19. Loops through the peak-in-bin frequency range one frequency location at a time.
   20. Indexes the peak-in-bin start location, sets the width of the search, and loops through the search range.
   21–22. Tests for the highest amplitude level in the search range and retains it along with the frequency location.
23–37. Combines multiple Spectral File time strips in a successive manner whereby each additional time strip further refines the previous combinations. Spectral time strips generated by a FFT of a shorter duration contribute more to the time resolution of the final time strip, while time strips generated by a FFT of a longer duration contribute more to the frequency resolution of the final time strip.
23–24. Tests if the current time strip is the first time strip in this combination, and, if so, copies the entire time strip to the destination time strip.
25–26. Loads from the Setup File the variables which control the subsequent combination and loads a corresponding time strip from the previous combination.
27–28. Examines whether any portion of the current time strip exists below the combine start location, and, if so, copies this lower range to the destination time strip.
29–30. Examines whether any portion of the current time strip exists above the combine end location, and, if so, copies this upper range to the destination time strip.
31. Examines whether a combination of time strips is required, and, if not, bypasses the combination process.
32. Loops through all of the frequencies in the overlap region.
33–34. Tests whether the previous amplitude or the current amplitude is zero, and, if either is the case, sets both amplitudes to zero.
35–36. Averages the two amplitudes together and clips the average to the previous amplitude, thus protecting the timing information from becoming distorted by the increasing time inaccuracies of the larger-dimensioned FFT-generated Spectral Files.
37. Saves the result in the current time strip.

COMPARISON
(Initial database generation)
NAME: InitDatabaseGenerate( )
FIG. 4

COMPARISON derives a Score File from a Spectral File by comparing the Spectral information to stored Fingerprint information. This initial database generation step constructs the database which is subsequently processed by further COMPARISON procedures. Acting as a preprocessor, the Initial Database Generation step uniquely determines which areas of the Spectral File Justify further comparison in order to reduce subsequent calculations.
1. Loops the variable "Fundamental" through a selected range of fundamental frequencies.
2. Calculates the Fingerprint's "FingerHeader" and "FingerData" addresses for Fundamental, then calculates the transposition between Fundamental and FingerHeader's fundamental frequency.
3. Loops the variable "StripNumber" through a selected range of time strips.
4. Loops the variable "CompletedPartials" through the partials listed in FingerHeader.
5. Calculates the Fingerprint's "FingerPartial" offset address for CompletedPartials.
6. Loops the variable "CompareStrip" through a selected number of time strips offset from StripNumber.
7. Calculates the Spectral File's "SpectralCenter" address for the frequency locations associated with CompareStrip.
8. Searches the higher and lower frequencies surrounding SpectralCenter to find a peak amplitude and corresponding frequency location.
9. Tests if Fundamental is locked onto a neighboring frequency and branches accordingly.
10–11. If a valid peak is found, compares the Fingerprint drift to the Spectral drift and calculates a drift variation score.
12. Compares the Fingerprint form to the Spectral form and derives a form variation score.

13. Compares the Fingerprint amplitude to the Spectral amplitude and derives an amplitude variation score.
14. Adjusts each partial's drift variation score based on frequency and time contraints.
15. Calculates the final scores for amplitude, drift, and form variation.
16–17. Tests if the variation scores are high enough to justify acceptance of the final scores, and, if so, saves the event into the Score database.

COMPARISON
(Time slope compare)
NAME: CompareTimeSlope( )
FIG. 5

Time Slope refers to the slope between two time strips at given frequency positions, as calculated from the amplitudes at those time strip and frequency locations. The Time Slope Comparison step uniquely determines a score which reflects how closely the time slopes for the Fingerprint and Spectral File match.
1. Loops the variable "CompletedPartials" through a selected range of frequency offsets.
2. Exits if the number of failed partials exceeds a certain limit.
3. Calculates the variable "FundamentalOffset" based on the current value of CompletedPartials by using the FundOffsetTable.
4. Derives the search-width-table address and Fingerprint data addresses.
5. Calculates the Spectral File's "SpectralCenter" address for the frequency locations associated with the current value of the variable "TimeStrip" and FundamentalOffset.
6. Searches higher and lower frequencies surrounding SpectralCenter to find a peak amplitude and corresponding frequency location.
7. Loops the variable "CompareStrip" through a selected number of time strips offset from TimeStrip.
8. Calculates the Fingerprint data offset address for the current TimeStrip and CompletedPartials.
9. Finds the peak amplitude for the next time strip.
10–11. Calculates the time slope for two points in Spectral File and adjusts its variation percentage based on the given slope's frequency, time strip, and amplitude.
12–13. Calculates the time slope for two points in the Fingerprint File and adjusts its variation percentage based on the given slope's frequency, time strip, and amplitude.
14–15. Derives a variation score by comparing the Spectral File's variation to the Fingerprint File's variation and compares that score to a minimum acceptable score.
16. Adds the time strip variation score to the partial variation score total.
17. Swaps the amplitude values for the next time strip slope calculation, thereby eliminating one amplitude extraction step.
18. Adds the variation score for one partial to the total variation score.
19. Increments the failed partial total if the number of failed time strips exceeds an established limit.
20. Calculates and saves the final time slope variation for all partials in the comparison.

COMPARISON
(Frequency distribution width compare)
NAME: CompareWidth( )
FIG. 6

Frequency Distribution Width refers to a found peak's full width above and below the peak's center. The Frequency Distribution Width Comparison step novelly determines a score that reflects how closely the Frequency Distribution Widths for the Fingerprint File and Spectral File match each other at given time and frequency locations.
1. Loops the variable "CompletedPartials" through the partials listed in FingerHeader.
2. Loops the variable "CompareStrip" through a selected range of time strips offset from the variable "TimeStrip".
3. Calculates the Fingerprint data address offsets.
4–5. Searches higher and lower frequencies surrounding SpectralCenter to find a peak amplitude and corresponding frequency location and sets form variables to NO_FORM if no peak amplitude is found.
6. Abandons the width search if previous steps found a "perfect" width.
7. Determines an accurate width for the peak, a description of the form of that peak, and a description of the form of the above and below segments of that peak.
8. Compares the width form of the Spectral File to the width form of the Fingerprint File and derives a width form variation score.
9. Calculates the width variation score for the current time strip.
10. Compares variation scores to minimum acceptance scores.
11. Adds the variation for one partial to the partial variation total.
12. Increments the failed partial total if the number of failed time strips exceeds an established limit.
13. Calculates and stores the width variation score for all partials in the comparison.

COMPARISON
(Find peak)
NAME: FindPeak( )
FIG. 7

FindPeak novelly locates the most clearly defined amplitude peak within a set frequency range around a center position. The search range is uniquely dynamically controlled based on the current time strip and frequency position.
1. Calculates the frequency search ran&e for this peak search and sets the variables "UpSearchRange" and "DnSearchRange" to the calculated search range.
2. Calculates the variable "TotalSearchRange" for further Comparison calculations.
3. Searches for a peak above and a peak below the center frequency within the frequency search range.
4. Searches above the center position for the nearest peak using slope direction flags and threshold flags.
5. Determines the amplitude of the current frequency position in the Spectral File.
6. Calculates the direction of the amplitude slope for neighboring frequency positions as being either UP, DOWN, or PLATEAU. PLATEAU refers to areas of relatively level amplitude and slowly changing slope.
7. Compares the Spectral File amplitude to a minimum threshold for the current frequency position, and stops searching if the amplitude level falls below the minimum threshold.
8. Searches below the center position for the nearest peak using slope direction flags and threshold flags.
9. Disables the search if the number of consecutive down slopes exceeds an established down slope tolerance.
10. Updates the peak amplitude and location if the most recently found amplitude is larger than the stored peak amplitude.
11. Sets the variable "PerfectWidth" to TRUE if a perfect width is found, thus implying that above and below the peak the amplitudes slope down to a minimum threshold.
12. Derives the form of the found peak from the search data under analysis.
13. Derives the form of the above and below slopes around the peak position based on search variables and width data.
14. Saves all peak data.

Figure 8A:
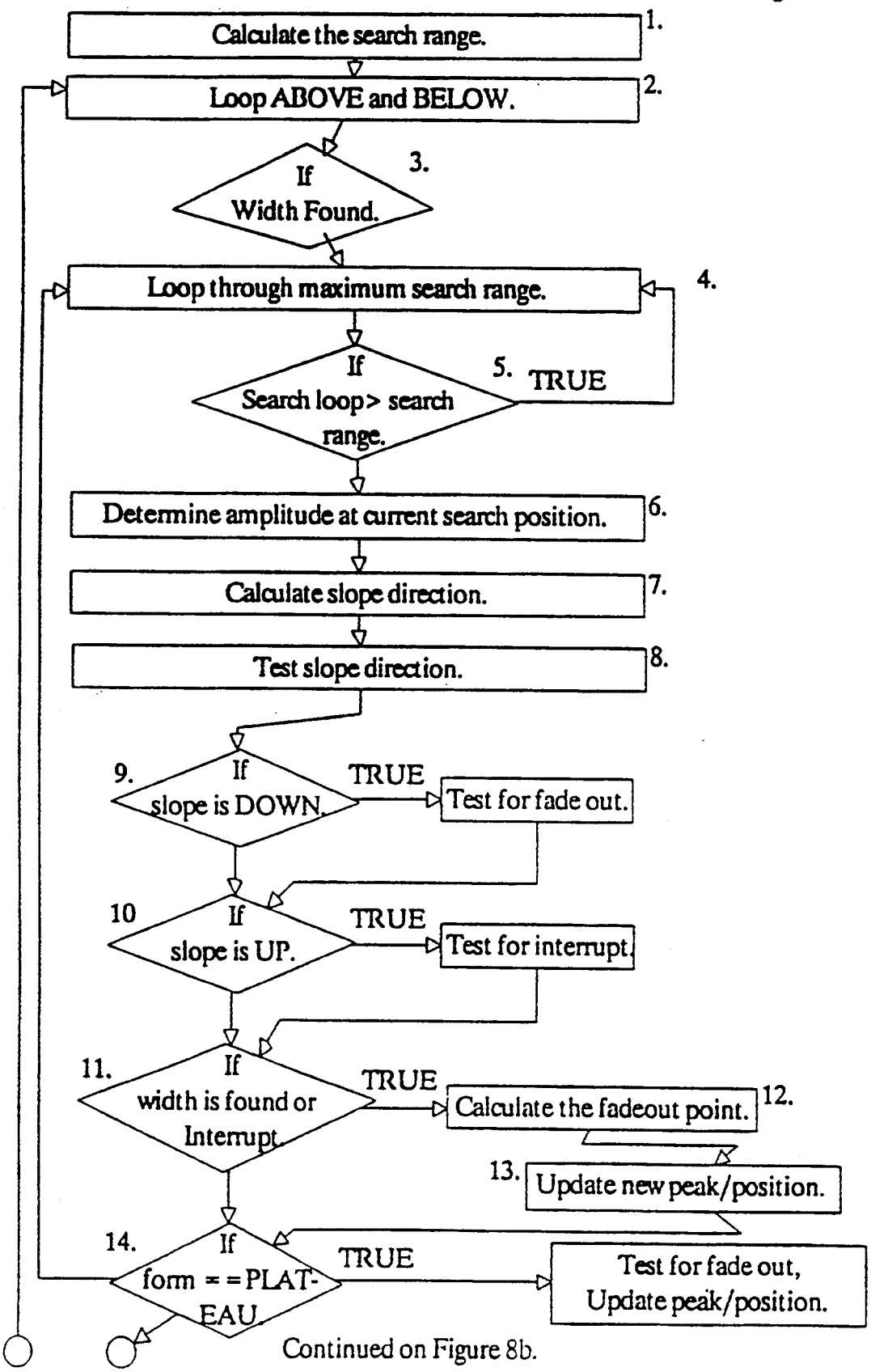
Figure 8B:
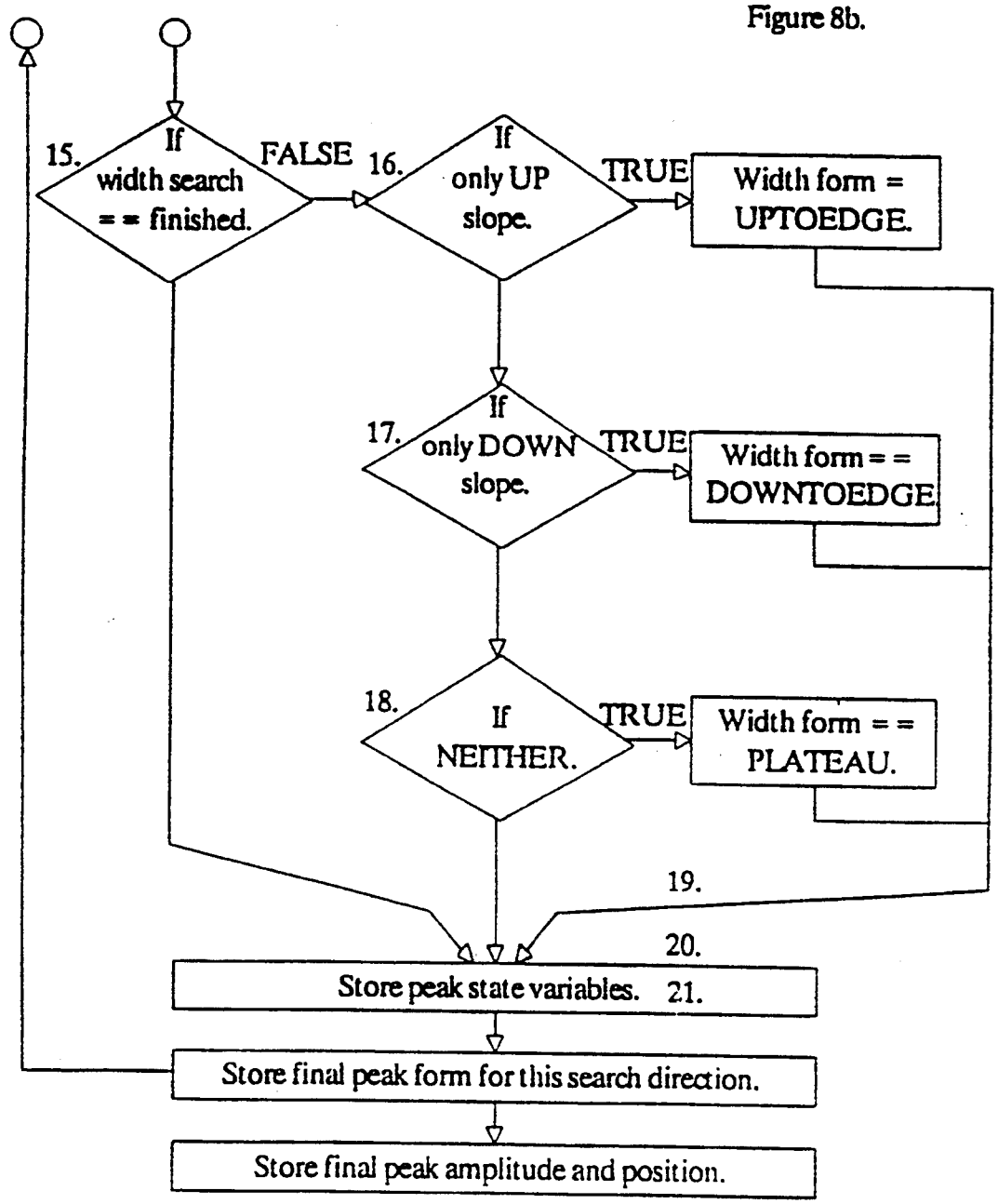

COMPARISON
(Find frequency distribution width)
NAME: FindFrequencyWidth( )
FIG. 8

Find Frequency Distribution Width uniquely determines the extent and shape of the peak in frequency space once the center position has been determined. Information is produced concerning the above peak and below peak width and form. If a better peak is found within the new search range, then the peak position and amplitude are updated.

1. Calculates the extent of the search in both the above and the below directions.
2. Loops the variable "Both" through the two possible search directions, ABOVE and BELOW.
3. Stops the search if the original peak search found a clearly defined width.
4. Loops the variable "Search" through the maximum search range allowed for either direction.
5. Abandons the search if the current value of Search exceeds the search limit for this direction.
6. Determines the amplitude at the current peak position.
7. Calculates the direction of the frequency slope and places this value in the variable "DirectionCase".
8. Branches depending on the calculated slope direction found in DirectionCase.
9. If the slope trend is downward, tests the peak amplitude to determine if it falls below a dynamically established threshold.
10. If the slope trend is upward, tests the slope rate of change for an interrupt condition. An interrupt condition implies that a slope which once had a downward trend suddenly changed direction at a rate exceeding a dynamically established limit.
11-12. Calculates the fadeout position on completion of the search or if the search has found an interrupt.
13. Updates the peak amplitude value and position if the search has not completed and there has not been an interrupt.
14. Updates the peak amplitude value and position if the slope direction is a PLATEAU.
15. Tests if the width search is finished and branches accordingly.
16. Sets the final width form to an "up only" condition if the slope within the search range is only an up slope to the edge of the search range.
17. Sets the final width form to a "down to edge" condition if the slope within the search range is only a down slope to the edge of the search range.
18. Sets the final width form to a plateau condition, if the nature of the slope within the search range is neither "up to edge" nor "down to edge".
19. Saves the current peak form in the final peak form variables.
20. Retains the current width form in the final width form variables.
21. Retains the final peak amplitude and position.

INTERPRETATION
(Control the interpretation of scores)
NAME: InterpretScores( )
FIG. 9

Interpretation of scores comprises two categories. One involves scanning the Score File generated by the Comparison process to determine local maximums where the Fingerprint and Spectral Files match best. The other involves novelly tracing the individual frequency components of the matched source forward in time from the lock position until they either fade out or are interrupted, thus allowing accurate determination of the duration of the tracked event. The start and end times, as well as performance parameters determined during the scan, are then stored in the final database.

1. Loads the current score from the Comparison File into the CompareScore structure.
2. Loops the variable "ScoreCount" through all scores in the Comparison File which fall between the established start and end time strips.
3. Tests if the current score's fundamental frequency falls between the established start and end frequencies and branches accordingly.
4. Evaluates the score and sets a flag if the score justifies further search.
5. Checks if the score falls within the frequency range of another search in progress.
6. Tests if the preliminary evaluation flag is TRUE and if this score is not in conflict with current searches in progress, and branches accordingly.
7. Loads a series of scores from the Comparison File which fall within a frequency and time strip range related to the current score.
8-9. Analyzes the series of scores to locate the most likely start of the event. If a clear event start is located, the "SeriesTest" flag is set to TRUE and tested.
10. Allocates resources in the duration database to track this event.
11. Tracks the partials of the event until the event's duration is determined.
12. Saves the found event if the event's duration exceeds an established lower limit.
13. Analyzes a time uncertainty and updates the knowledge base if the SeriesTest flat indicates a time uncertainty.
14. Analyzes a poor score and updates the knowledge base if the SeriesTest flag indicates a poor score.
15. Increments the current score count and loads in the next score from the Comparison File.

Figure 10:
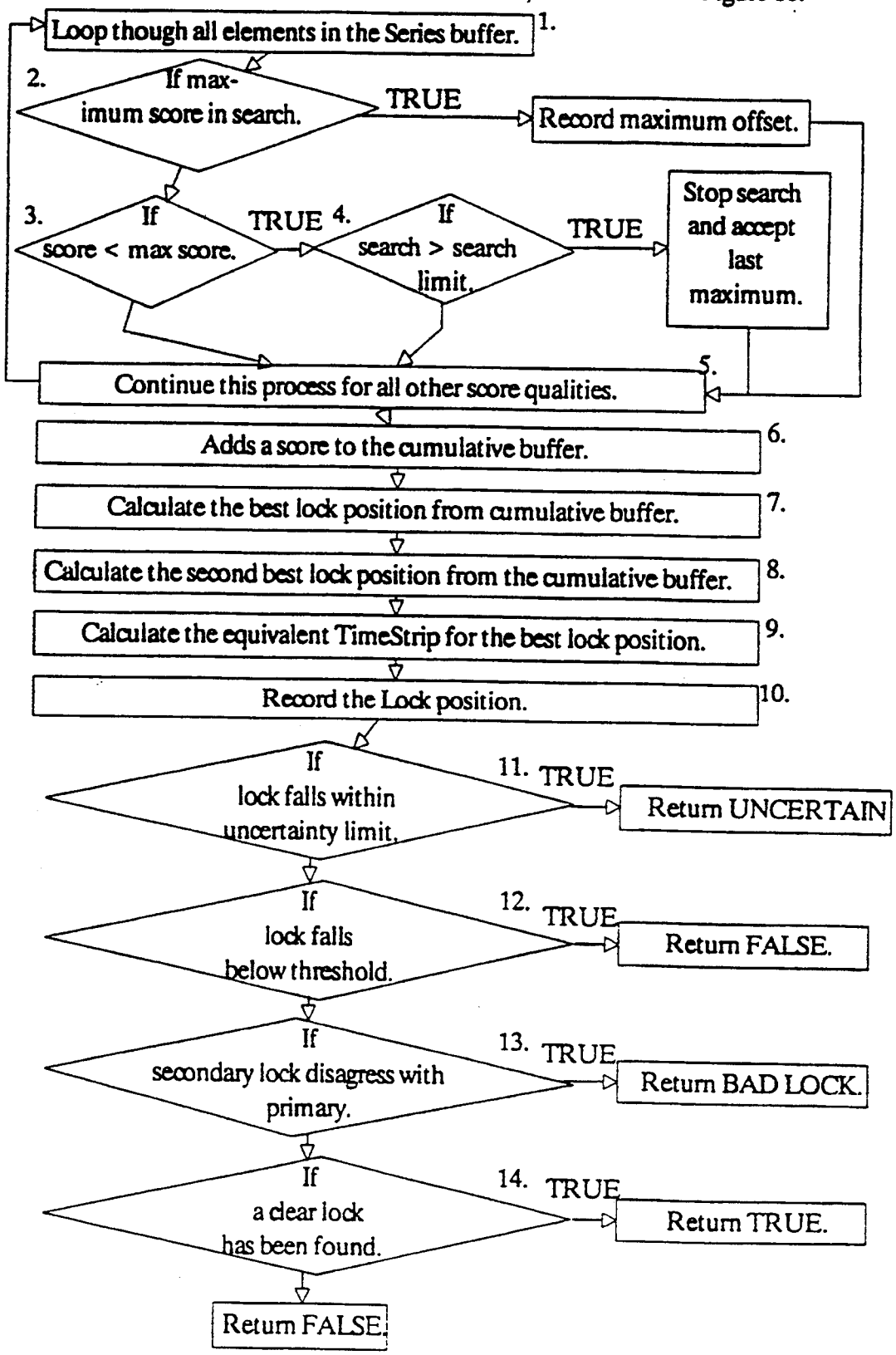

INTERPRETATION
(Evaluate a series of scores)
NAME: EvaluateSeries( )
FIG. 10

Evaluate a Series of Scores novelly gathers a series of scores of related frequencies over a limited range of time strips, then uniquely locates the most likely score maximum within that series, and novelly calculates the equivalent time strip based on the offset into the score series. It also novelly provides useful information concerning potential errors in the analysis.

1. Loops the variable "SeriesLoop" through each entry in the series.
2. Records the series location of the current score if it is the maximum score in the series search.
3. Continues searching for the maximum score if the current score falls below the found maximum score.
4. Accepts the most recent maximum score if the search has reached an established search range limit without encountering a better maximum for this score attribute.
5. Continues this process for all other score attributes.
6. Calculates a lock position using a cumulative buffer. Adds a score to the cumulative buffer at the series offset where an attribute's score reaches a maximum. If several attributes lock on the mama location the lock position will show an excellent cumulative score.
7. Calculates the best cumulative locking position by scanning the cumulative buffer.
8. Searches the cumulative buffer again and finds a secondary locking position.
9. Calculates the time strip which corresponds to the best locking position found in the cumulative buffer.
10. Records the best lock position.
11. Sets flags indicating that this region must be analyzed further if the cumulative buffer value at the lock position falls within an established uncertainty limit.
12. Sets flags indicating that an event has not been found within the time strip range of the Series array if the cumulative buffer value at the lock position falls below an established threshold.
13. Sets flags indicating that the exact lock position cannot be determined if a secondary lock position exists at an established distance separate from the primary lock position.
14. Sets flags indicating that the lock position is acceptable if a clear lock has been attained.

Figure 11B:
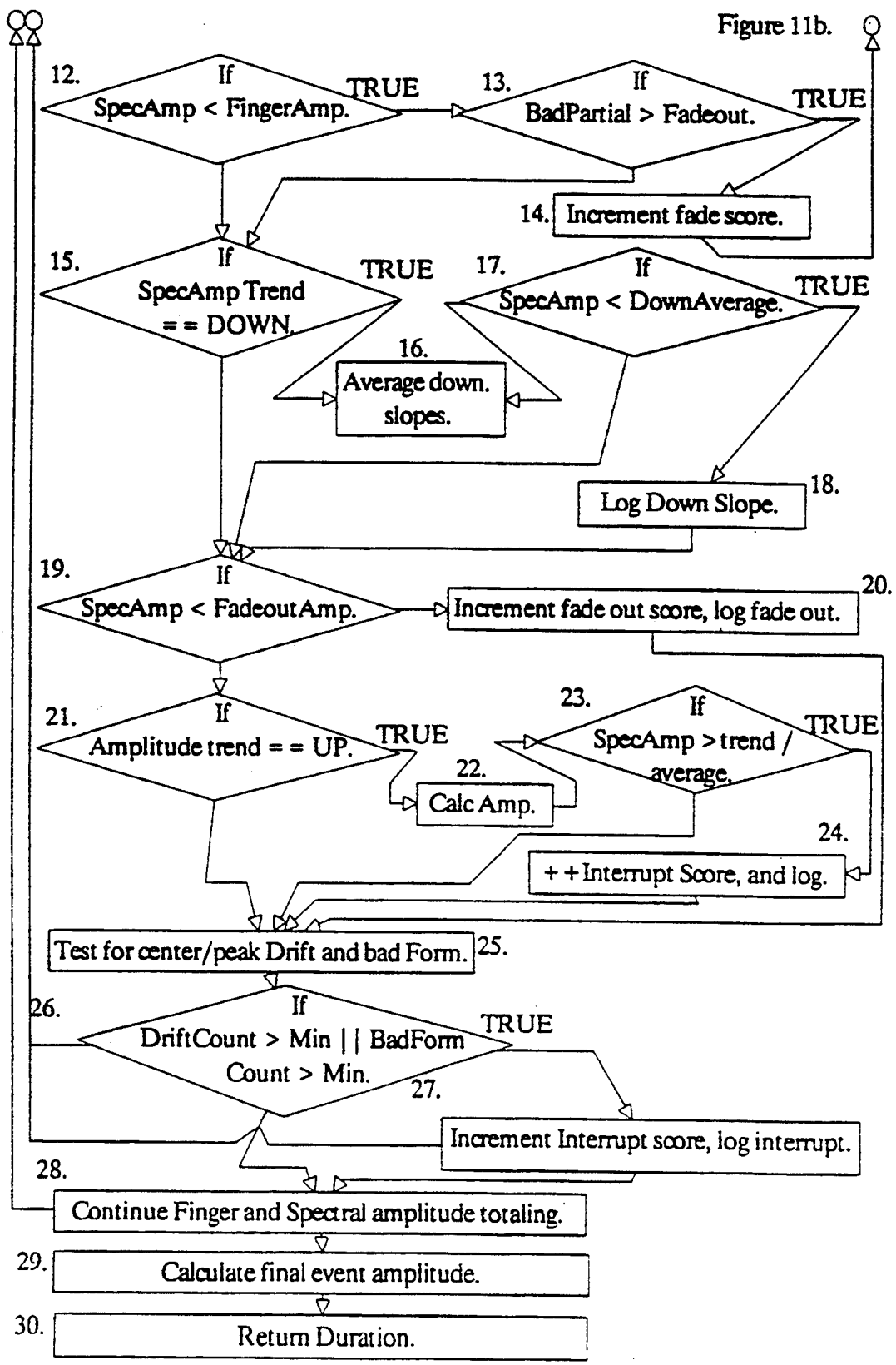

INTERPRETATION
(Find the duration of an event)
NAME: FindDuration()
FIG. 11

Once an event has started, its duration is tracked by the FindDuration routine which novelly monitors the Spectral File's partials at the frequency locations specified by the FingerPrint File and detects when the partial fades out or is interrupted by another event. As each partial is canceled by fade-out or by interruption, the total partial count is decremented. As active partials decrease, flags are set to indicate "fragile" duration tracking. Interpretation routines monitor the stability of the duration tracking for the current event. When active partials fall below a user-defined minimum, the event is flagged as complete and all duration tracking resources are freed.

1. Tests if this event is a continuation of a preceding duration scan. If so, fade-out and interrupt entries in the database are tested, and the FadeScore and InterruptScore are appropriately updated with the correct number of inactive partials.
2. Controls the loop through all of the partials.
3. Calculates the bit mask and database indexes needed by subsequent Interpretation steps.
4-5. Tests if the current partial has already faded out or has been interrupted, and, if so, increments a completed partial count. Before an interrupt condition can occur a series of down slopes must take place. By searching for an initial down slope the duration tracking routines allow the initial attack portion of an event to transpire successfully and to start to decay in amplitude.
6. Examines the duration tracking database and determines if a down slope occurred during a previous duration scan.
7. Calculates the memory address of the beginning of the Fingerprint data.
8. Controls the loop through the time strips.
9. Accumulates a Fingerprint amplitude total used in determining the current event's amplitude.
10. Retrieves the amplitude of the Spectral File for the current position in frequency and time.
11. Accumulates the Spectral File amplitude total used to calculate an event amplitude.
12-14. Compares the Spectral amplitude to the Fingerprint amplitude, and, if the Spectral amplitude falls below a user-defined percentage of the Fingerprint amplitude, a bad-partial count is incremented. If the bad-partial count exceeds a rejection threshold, the partial is marked as completed and a FadeScore count is incremented. If enough partials fall below the rejection threshold and if this duration scan is the first for the current event, then FindDuration marks this event as invalid.
15-18. Sets bits in the duration tracking database if the current amplitude falls substantially below the calculated running amplitude average and a down slope is found.
19-20. Tests if the current Spectral amplitude falls below the fade-out amplitude, and, if so, sets fade-out bits in the duration tracking database.
21-22. Tests if the general slope of the last few amplitude levels is trending in an upward direction. If so, a more extensive amplitude trend is calculated.
23-24. Sets bits in the duration tracking database and increments the interrupt score if the current amplitude level exceeds the trend level plus an offset amount.
25. Accumulates a wild frequency drift count and a bad-form count. Since certain event combinations can destroy the recognizable fade-out and interrupt characteristics of the Spectral File, a third test can be made to test for wild frequency drift and dramatic form variations since these conditions indicate a new event obscuring the tracking capabilities of FindDuration.
26-27. Tests if the wild-drift count or bad-form count exceeds an established minimum, and, if so, sets bits in the duration tracking database.
28. Totals the amplitudes for the current partial.
29. Calculates an event amplitude if this is the first duration scan.
30. Assigns the results of the duration scan to the variables returned from FindDuration.

Figure 12B:
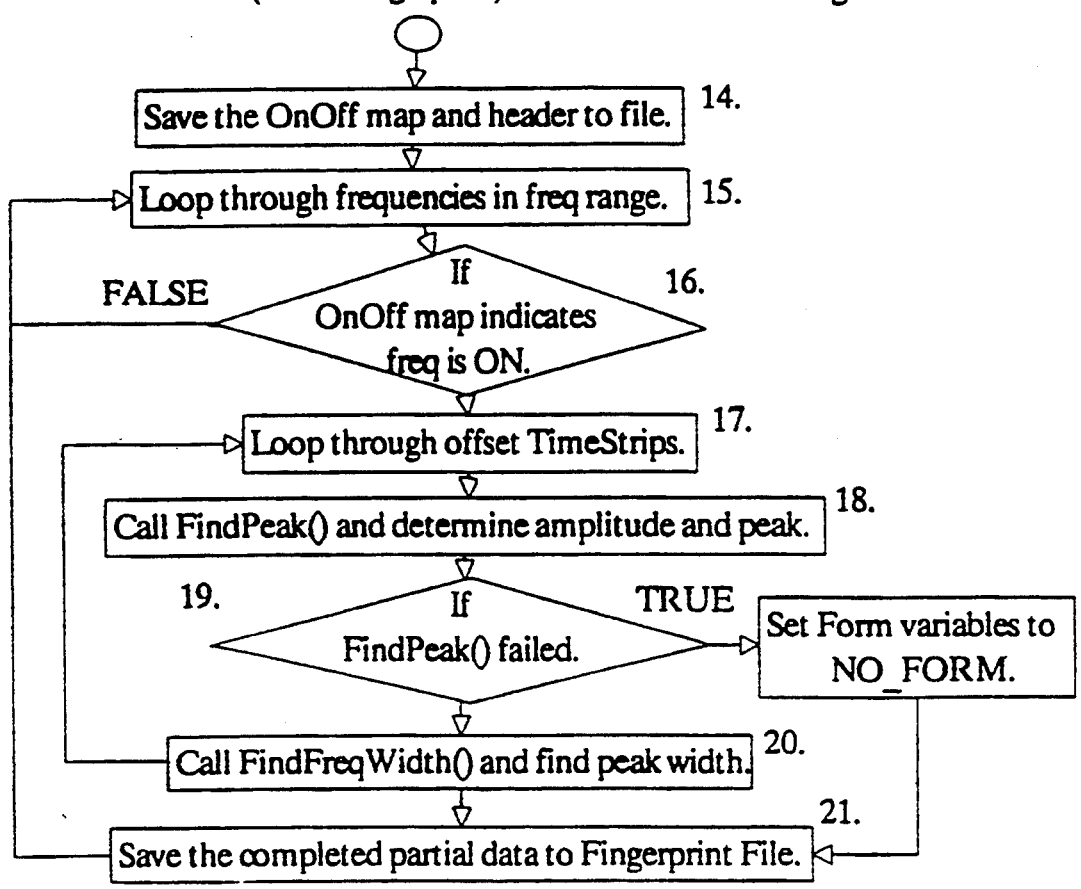
Figure 14:
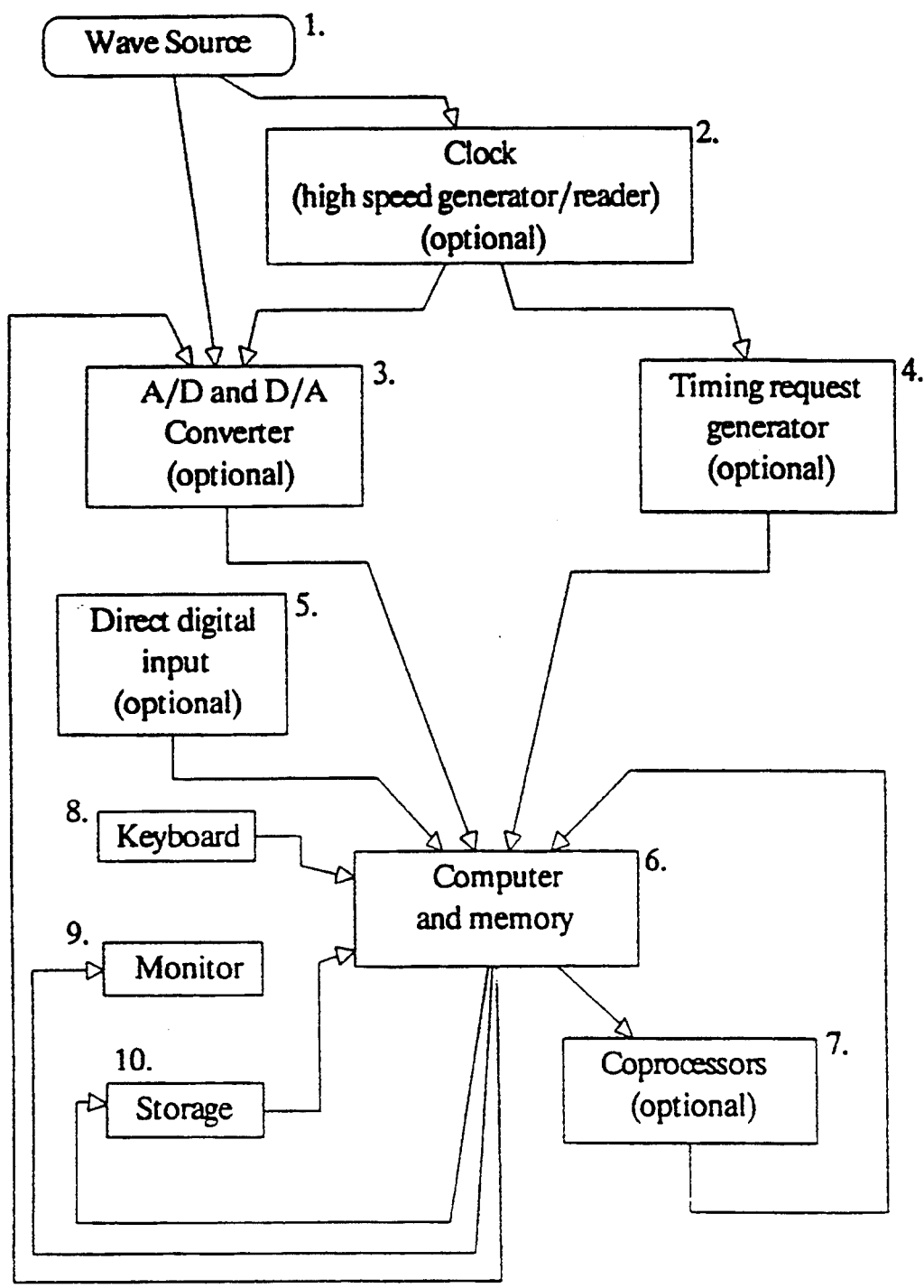
FIG. 14 APPARATUS OVERVIEW is a block diagram showing the flow of signals and data among individual apparatus components, some of which are optional, in accordance with a particular application.

FINGERPRINT
(Make Fingerprint)
NAME: MakeFingerprint( )
FIG. 12

MakeFingerprint uniquely extracts and saves the identifying characteristics of a Spectral File from a known source. The Spectral File is scanned at each partial's frequency position for frequency peaks and general drift centers are determined. The Spectral File is analyzed a second time, and the peak amplitudes, drifts, widths, and details of peak structure are saved for each peak. The final result is a Fingerprint File containing the essential information describing the known source.

1. Initializes the variables for the Fingerprint generation process.
2. Loops the variable "FreqLoop" through all frequencies in the Fingerprint generation frequency range and fills the PartialOnOff map.
3. Loops the variable "TimeLoop" through a set range of time strips.
4. Finds the amplitude peak nearest in frequency to FreqLoop.
5. Sets the above and below form variables to the NO_FORM state if an accurate peak cannot be found, thus indicating that the peak has no discernable form.
6. Finds the frequency width, form, and drift.
7. Disables the analysis of this partial if the drift is extremely erratic over several time strips. Erratic drift implies an uncertain frequency position for the partial.
8. Marks the current time strip as being the end of the drift-center determination range unless the current amplitude exceeds a dynamic threshold, in which case the amplitude is included in the determination of the drift center position.
9. Calculates the increment to the "PartialAmp" value based on a comparison of the current partial to a known standard amplitude.
10. Finds the common drift center for the partial under analysis.
11. Logs the partial in the PartialOnOff map without drift if the finished partial is the fundamental.
12. Logs the partial in the PartialOnOff map if the number of strips used in the calculation of the common drift center exceeds the minimum number of required time strips.
13. Calculates the next recommended frequency to analyze from a map of partial ratios.
14. Saves the calculated PartialOnOff map and associated variables in the Fingerprint File.
15. Loops the variable FreqLoop through all frequencies in the Fingerprint generation range and fills the Fingerprint with the correct amplitude levels.
16–17. Loops the variable TimeLoop through an established range of time strips if the PartialOnOff map indicates that the current frequency corresponds to a listed partial.
18. Finds the amplitude peak closest to the partial under analysis.
19. Sets the Form variables to NO_FORM if an accurate peak cannot be found, thus implying that the peak has no form.
20. Finds the frequency width, form, and drift.
21. Saves the completed Fingerprint partial data in the Fingerprint File.

SYNCHRONIZATION
(General discussion.)

To facilitate the ensuing discussion of the Synchronization procedures, devices and control procedures common to the music and recording industry are included for purposes of illustration and in no way imply any limit on the general applicability of the invention.

Recording processes in the music industry commonly utilize a standard synchronizing timing protocol specified by the Society of Motion Picture and Television Engineers (SMPTE). In addition, the Musical Instrument Digital Interface (MIDI), a standard for describing and controlling the exchange of music information between electronic instruments and related devices, is also in widespread use in the industry. Thus, application of the invention to the analysis of acoustic waveforms in music involves interfacing with a SMPTE generator/reader as a high-resolution clocking device. Such devices are typically capable of generating MIDI realtime clock signals that can be passed to an apparatus in accordance with the invention via a MIDI serial interface that is responsible for generating the timing requests to which the invention responds.

For digital sampling purposes an analog-to-digital converter controlled by a dedicated signal processing device is suggested. Whatever the field of application, the sampling device selected should be capable of sampling at a rate corresponding to the demands of the waveform being recorded and of responding to START_RECORD, STOP_RECORD, and ELAPSED_SAMPLE requests from the invention.

SYNCHRONIZATION
(Record a Sample File, and generate sync table)
NAME: RecordAndSync( )
FIG. 13A 1–3. Allocates memory for the synchronization table, initializes the record variables and counters, enables the interrupts (timing requests), sets the interrupt rate, and initializes the interrupt processing routines.
4. Starts the recording process.
5–7. Sends an END_RECORD command and disables the interrupt processing routines if a stop-recording request is received from the user.
8. Saves the synchronization table.

SYNCHRONIZATION
(Event time request processing)
NAME: proc_int
FIG. 13B

These routines utilize assembly language in order to provide a quick, accurate, and precise response to interrupts.

1–2. Retrieves the data placed in the data port by the interrupt generating process and verifies the presence of a clock identifier command.
3–4. Retrieves the elapsed sample count from the sampling device, clears the sampling device's elapsed sample counter, and stores the elapsed sample count in the synchronization table.

SYNCHRONIZATION
(Calculate synchronized time from sync table)
NAME: GetSyncTimeData( )
FIG. 13C 1. Calculates the absolute time of the requested StartTimeStrip as well as the absolute interrupt count that would be associated with this absolute time if the measurement and recording of the-passage of time were constant. Also calculates the difference between (a) the time associated with the interrupt count which falls immediately before the requested StartTimeStrip (LowerInterrupt) and (b) the absolute time of the requested StartTimeStrip.
2. Searches the synchronization table to find the sample count associated with the LowerInterrupt and the sample count associated with the interrupt immediately following the absolute interrupt.
3. Calculates the number of samples between the lower sample count and the upper sample count and multiplies this quantity by the time difference calculated in block 1 (above), thus resulting in the sample offset from the lower interrupt sample count.
4. Adds the lower interrupt sample count to the sample offset to calculate the final sample count.
5. Multiplies the final sample count by the time of one sample in order to calculate the final synchronized time.

Timing accuracy of these processes can be increased by decreasing the time interval between interrupts.

Although the invention has been described with reference a preferred embodiment, other embodiments can achieve the same results. Variations and modifications of the present invention will be obvious to those skilled in the art, and the appended claims are intended to cover all such modifications and equivalents.

What is claimed is:

1. A computer implemented method for determining a similarity between a discrete portion of a continuous stream of wave data and a set of frequency ratios derived from the continuous stream of wave data, the method comprising the steps of:
   (a) generating a spectral time strip for the discrete portion of the continuous stream of wave data, the spectral time strip including at least a first partial and a second partial;
   (b) determining a first frequency position for a prevalent amplitude peak of the first partial;
   (c) determining a second frequency position for a prevalent amplitude peak of the second partial;
   (d) determining a first frequency ratio according to the expression $$\frac{\text{second frequency position}}{\text{first frequency position}};$$

(e) comparing the first frequency ratio with at least one frequency ratio from the set of frequency ratios to obtain a similarity score; and
   (f) generating a signal according to a predetermined scale that is indicative of the degree of similarity between the discrete portion of the continuous stream of wave data and at least one frequency ratio from the set of frequency ratios.

2. A computer implemented method for determining a similarity between a first discrete portion of a continuous stream of wave data and a second discrete portion of the continuous stream of wave data, the method comprising the steps of:
   (a) inputting the continuous stream of wave data;
   (b) generating, from the continuous stream of wave data, spectral wave data that includes at least a first time strip and a second time strip, the first time strip including at least a first partial and a second partial, the second time strip including at least a third partial and a fourth partial, the third partial being time related to the first partial and the fourth partial being time related to the second partial;
   (c) generating a first frequency ratio between the first partial and the second partial according to the expression $$\frac{\text{frequency of the second partial}}{\text{frequency of the first partial}};$$

(d) storing the first frequency ratio;
   (e) generating a second frequency ratio between the third partial and the fourth partial according to the expression $$\frac{\text{frequency of the fourth partial}}{\text{frequency of the third partial}};$$

(f) comparing the second frequency ratio with the stored first frequency ratio to obtain a similarity score; and
   (g) generating a signal according to a predetermined scale that is indicative of the degree of similarity between the first time strip and the second time strip.

3. The method of claim 2, wherein the continuous stream of wave data includes a continuous stream of complex wave data.

4. The method of claim 2, wherein the continuous stream of wave data includes a continuous stream of digital wave data.

5. The method of claim 2, wherein the continuous stream of wave data includes a continuous stream of analog wave data.

6. A computer implemented method for determining a similarity between a first discrete portion of a continuous stream of wave data and a second discrete portion of the continuous stream of wave data, the method comprising the steps of:
   (a) inputting the continuous stream of wave data;
   (b) generating, from the continuous stream of wave data, spectral wave data that includes at least a first time strip and a second time strip, the first time strip including at least a first partial and a second partial, the second time strip including at least a third partial and a fourth partial;
   (c) generating a first frequency ratio between the first partial and the second partial according to the expression $$\frac{\text{frequency of the second partial}}{\text{frequency of the first partial}};$$

(d) generating a second frequency ratio between the third partial and the fourth partial according to the expression $$\frac{\text{frequency of the fourth partial}}{\text{frequency of the third partial}};$$

(e) comparing the second frequency ratio with the first frequency ratio to obtain a similarity score; and
   (f) generating a signal according to a predetermined scale that is indicative of the degree of similarity between the first time strip and the second time strip.

7. The method of claim 6 wherein the continuous stream of wave data includes a continuous stream of complex wave data.

8. The method of claim 6, wherein the continuous stream of wave data includes a continuous stream of digital wave data.

9. The method of claim 6 wherein the continuous stream of wave data includes a continuous stream of analog wave data.

10. The computer implemented method of claim 6 wherein the third partial is time related to the first partial and the fourth partial is time related to the second partial.

11. A computer implemented method for determining a similarity between a discrete portion of a first continuous stream of wave data and a discrete portion of a second continuous stream of wave data, the method comprising the steps of:
 (a) inputting the first continuous stream of wave data;
 (b) generating, from the first continuous stream of wave data, spectral wave data that includes at least a first time strip, the first time strip including at least a first partial and a second partial;
 (c) generating a first frequency ratio between the first partial and the second partial according to the expression $$\frac{\text{frequency of the second partial}}{\text{frequency of the first partial}};$$

(d) inputting the second continuous stream of wave data;
 (e) generating, from the second continuous stream of wave data, spectral wave data that includes at least a second time strip, the second time strip including at least a third partial and a fourth partial;
 (f) generating a second frequency ratio between the third partial and the fourth partial according to the expression $$\frac{\text{frequency of the fourth partial}}{\text{frequency of the third partial}};$$

(g) comparing the second frequency ratio with the first frequency ratio to obtain a similarity score; and
 (h) generating a signal according to a predetermined scale that is indicative of the degree of similarity between the first continuous stream of wave data and the second continuous stream of wave data.

12. The computer implemented method of claim 11, wherein the third partial is time related to the first partial and the fourth partial is time related to the second partial.

13. The computer implemented method of claim 11, wherein step (c) further comprises storing the first frequency ratio.

14. A computer implemented method for determining a similarity between discrete portions of a continuous stream of wave data, the method comprising the steps of:
 (a) inputting the continuous stream of wave data;
 (b) generating, from the continuous stream of wave data, first spectral wave data that includes at least a first time strip, the first time strip including at least a first partial and a second partial;
 (c) generating a first frequency ratio between the first partial and the second partial according to the expression $$\frac{\text{frequency of the second partial}}{\text{frequency of the first partial}};$$

(d) generating, from the continuous stream of wave data, second spectral wave data that includes at least a second time strip, the second time strip including at least a third partial and a fourth partial;
 (e) generating a second frequency ratio between the third partial and the fourth partial according to the expression $$\frac{\text{frequency of the fourth partial}}{\text{frequency of the third partial}};$$

(f) comparing the second frequency ratio with the first frequency ratio to obtain a similarity score; and
 (g) generating a signal according to a predetermined scale that is indicative of the degree of similarity between the first spectral wave data and the second spectral wave data.

15. The computer implemented method of claim 14, wherein the third partial is time related to the first partial and the fourth partial is time related to the second partial.

16. The computer implemented method of claim 14, wherein step (c) further comprises storing the first frequency ratio.

17. A computer implemented method for determining a similarity between a first spectral wave data and a second spectral wave data, the method comprising the steps of:
 (a) inputting the first spectral wave data that includes a first time strip, the first time strip including at least a first partial and a second partial;
 (b) generating a first frequency ratio between the first partial and the second partial according to the expression $$\frac{\text{frequency of the second partial}}{\text{frequency of the first partial}};$$

(c) inputting the second spectral wave data that includes a second time strip, the second time strip including at least a third partial and a fourth partial;
 (d) generating a second frequency ratio between the third partial and the fourth partial according to the expression $$\frac{\text{frequency of the fourth partial}}{\text{frequency of the third partial}};$$

(e) comparing the second frequency ratio with the first frequency ratio to obtain a similarity score; and
 (f) generating a signal according to a predetermined scale that is indicative of the degree of similarity between the first spectral wave data and the second spectral wave data.

18. The computer implemented method of claim 17, wherein the third partial is time related to the first partial and the fourth partial is time related to the second partial.

19. The computer implemented method of claim 17, wherein step (b) further comprises storing the first frequency ratio.

20. A computer implemented method for determining a change in characteristics in a continuous stream of wave data, the method comprising the steps of:
 (a) inputting the continuous stream of wave data;
 (b) generating from the continuous stream of wave data at a first time interval first spectral wave data that includes a plurality of time strips, with each time strip further including at least a first partial and a second partial;

(c) generating a frequency ratio between the first partial and the second partial for each time strip of the first spectral wave data according to the expression $$\frac{\text{frequency of the second partial}}{\text{frequency of the first partial}};$$

(d) storing the frequency ratios for each time strip;

(e) generating from the continuous stream of wave data at a second time interval second spectral wave data that includes a plurality of time strips, with each time strip further including at least a third partial and a fourth partial, with the third partial being time related to the first partial, and the fourth partial being time related to the second partial;

(f) generating a frequency ratio between the third partial and the fourth partial for each time strip of the second spectral wave data according to the expression $$\frac{\text{frequency of the fourth partial}}{\text{frequency of the third partial}};$$

(g) comparing each frequency ratio of spectral wave data associated with the second spectral wave data with the stored frequency ratio of a predetermined time strip of the first spectral wave data to obtain a score for each time strip; and (h) generating a signal for each time strip according to a predetermined scale that is indicative of the degree of similarity between the continuous stream of wave data at the first time interval and the continuous stream of wave data at the second time interval.

21. The method of claim 20, wherein the continuous stream of wave data includes a continuous stream of complex wave data.

22. The method of claim 20, wherein the continuous stream of wave data includes a continuous stream of digital wave data.

23. The method of claim 20, wherein the continuous stream of wave data includes a continuous stream of analog wave data.

24. A computer implemented method for determining the similarity between discrete portions of a continuous stream of wave data, the method comprising the steps of:

(a) inputting the continuous stream of wave data;

(b) generating from the continuous stream of wave data first spectral wave data and second spectral wave data, the first spectral wave data further including a first plurality of time strips, with each time strip of the first plurality of time strips including at least a first partial, the second spectral wave data further including a second plurality of time strips, with each time strip of the second plurality of time strips including at least a second partial;

(c) comparing an amplitude for each of the plurality of time strips of the first partial with an amplitude for each of the plurality of time related time strips of the second partial;

(d) subtracting the amplitudes of the time strips of the second partial from the amplitudes of the time strips of the first partial, respectively, for each comparison at step (c) to obtain an amplitude difference for each of the respective time strips;

(e) summing each amplitude difference to obtain a total difference to determine if said difference is less than a predetermined value to indicate similarity; and (f) generating a signal indicative of the degree of similarity between the first spectral wave data and the second spectral wave data based on the total difference determined at step (e).

25. The method as recited in claim 24, wherein the method further comprises the steps of:

(a) determining an offset percentage for each comparison at step (c);

(b) comparing the offset percentages to determine if there is a substantially consistent offset percentage for each comparison at step (c); and (c) normalizing the time strip from the second spectral wave data if the offset percentages are within a predetermined range.

26. A computer implemented method for determining a similarity between a first spectral time strip and a second spectral time strip for a continuous stream of wave data, the method comprising the steps of:

(a) generating a first spectral time strip for a first discrete portion of the continuous stream of wave data, the first spectral time strip including at least one partial;

(b) scanning the first spectral time strip within a predetermined frequency range for a first amplitude peak that is most prevalent;

(c) determining a first frequency position for the first amplitude peak;

(d) determining a first frequency envelope for the amplitude peaks with a frequency envelope including the first amplitude peak;

(e) determining a first relative drift between the first amplitude peak and each of the amplitude peaks in the first frequency envelope;

(f) determining a first drift center based on an average of the plurality of relative drifts determined at step (e);

(g) generating a second spectral time strip for a second discrete portion of the continuous stream of wave data, the second spectral time strip including at least one partial;

(h) scanning the second spectral time strip within a predetermined frequency range for a second amplitude peak that is most prevalent;

(i) determining a second frequency position for the second amplitude peak;

(j) determining a second frequency envelope for the amplitude peaks with a frequency envelope including the second amplitude peak;

(k) determining a second relative drift between the second amplitude peak and each of the amplitude peaks in the second frequency envelope;

(l) determining a second drift center based on an average of the plurality of relative drifts determined at step (k);

(m) comparing the second drift center with the first drift center to obtain a similarity score; and (n) generating a signal according to a predetermined scale that is indicative of the degree of similarity between the second frequency drift envelope and the first frequency drift envelope.

27. The method of claim 26, wherein the continuous stream of wave data includes a continuous stream of complex wave data.

28. The method of claim 26, wherein the continuous stream of wave data includes a continuous stream of digital wave data.

29. The method of claim 26 wherein the continuous stream of wave data includes a continuous stream of analog wave data.

30. A computer implemented method for determining a similarity between discrete portions of a continuous stream of wave data, the method comprising the steps of:
   (a) inputting a continuous stream of wave data;
   (b) generating from the continuous stream of wave data first spectral wave data, the first spectral wave data further including a first plurality of time strips, each of the first plurality of time strips including at least a first partial and a second partial;
   (c) generating first distortion information for each of the first plurality of time strips of the first spectral wave data;
   (d) storing the first distortion information for each of the first plurality of time strips;
   (e) generating from the continuous stream of wave data second spectral wave data, the second spectral wave data further including a second plurality of time strips, each of the second plurality of time strips including at least a third partial and a fourth partial;
   (f) generating second distortion information for each of the second plurality of time strips of the second spectral wave data;
   (g) comparing, for each of the plurality of time strips, the second distortion information with the stored first distortion information to obtain a similarity score for each time strip; and
   (h) generating signals according to a predetermined scale that are indicative of the degree of similarity between the first spectral wave data and the second spectral wave data.

31. The method of claim 30, wherein the continuous stream of wave data includes a continuous stream of complex wave data.

32. The method of claims 30, wherein the continuous stream of wave data includes a continuous stream of digital wave data.

33. The method of claim 30, wherein the continuous stream of wave data includes a continuous stream of analog wave data.

34. The method of claim 30, wherein the first distortion information includes amplitude-independent, frequency- distribution widths for the first and second partials, and the second distortion information includes amplitude-independent, frequency-distribution widths for the third and fourth partials.

35. The method of claim 30, wherein the first distortion information includes amplitude-independent, frequency-distribution widths settle-times for the first and second partials, and the second distortion information includes amplitude-independent, frequency-distribution widths settle-times for the third and fourth partials.

36. The method of claim 30, wherein the first distortion information includes amplitude-independent, frequency-distribution width forms for the first and second partials, and the second distortion information includes amplitude-independent, frequency-distribution width forms for the third and fourth partials.

37. A computer implemented method for determining a similarity between discrete portions of a continuous stream of wave data, the method comprising the steps of:
   (a) inputting a continuous stream of wave data;
   (b) generating from the continuous stream of wave data first spectral wave data, the first spectral wave data further including a first time strip, the first time strip including at least a first partial and a second partial;
   (c) generating first distortion information for the first time strip;
   (d) generating from the continuous stream of wave data second spectral wave data, the second spectral wave data further including a second time strip, the second time strip including at least a third partial and a fourth partial;
   (e) generating second distortion information for the second time strip;
   (f) comparing the second distortion information with the first distortion information to obtain a similarity score; and
   (g) generating a signal according to a predetermined scale that is indicative of the degree of similarity between the first spectral wave data and the second spectral wave data.

38. The method of claims 37, wherein the continuous stream of wave data includes a continuous stream of complex wave data.

39. The method of claim 37, wherein the continuous stream of wave data includes a continuous stream of digital wave data.

40. The method of claim 37, wherein the continuous stream of wave data includes a continuous stream of analog wave data.

41. The method of claim 37, wherein the first distortion information includes amplitude-independent, frequency-distribution widths for the first and second partials, and the second distortion information includes amplitude-independent, frequency-distribution widths for the third and fourth partials.

42. The method of claim 37, wherein the first distortion information includes amplitude-independent, frequency-distribution widths settle-times for the first and second partials, and the second distortion information includes amplitude-independent, frequency-distribution widths settle-times for the third and fourth partials.

43. The method of claim 37, wherein the first distortion information includes amplitude-independent, frequency-distribution width forms for the first and second partials, and the second distortion information includes amplitude-independent, frequency-distribution width forms for the third and fourth partials.

44. A computer implemented method for determining a similarity between first spectral wave data and second spectral wave data, the method comprising the steps of:
   (a) inputting first spectral wave data, the first spectral wave data further including a first time strip, the first time strip including at least a first partial and a second partial;
   (b) generating first distortion information for the first time strip;
   (c) inputting second spectral wave data, the second spectral wave data further including a second time strip, the second time strip including at least a third partial and a fourth partial;
   (d) generating second distortion information for the second time strip;

(e) comparing the second distortion information with the first distortion information to obtain a similarity score; and (f) generating a signal according to a predetermined scale that is indicative of the degree of similarity between the first spectral wave data and the second spectral wave data.

45. A computer implemented method for determining a similarity between first spectral wave data and a discrete portion of a continuous stream of wave data, the method comprising the steps of:

(a) inputting as a first input first spectral wave data, the first spectral wave data further including a plurality of time strips, with each time strip including at least a first partial and a second partial;

(b) generating a first signal that includes first distortion information for each time strip of the first spectral wave data;

(c) storing the first distortion information for each time strip of the first spectral wave data;

(d) inputting as a second input a continuous stream of wave data;

(e) generating from the second input spectral wave data that includes a plurality of time strips, with each time strip further including at least a third partial and a fourth partial;

(f) generating a second signal that includes second distortion information for each time strip of the spectral wave data;

(g) comparing the second distortion information with the stored first distortion information to obtain a similarity score for each time strip; and (h) generating signals according to a predetermined scale that are indicative of the degree of similarity between the first spectral wave data and the continuous stream of wave data.

46. An apparatus for determining a similarity between at least one stored frequency ratio and discrete portions of a continuous stream of wave data, the apparatus comprising:

(a) storage device for storing at least one frequency ratio;

(b) input device that receives discrete portions of the continuous stream of wave data;

(c) first generator coupled to the output of the input device for generating a spectral time strip with the spectral time strip including at least a first and a second partial;

(d) a processor for determining a first frequency position for a prevalent amplitude peak of the first partial, a second frequency position for a prevalent amplitude peak of a second partial, and generating a first frequency ratio according to the expression $$\frac{\text{second frequency position}}{\text{first frequency position}} \text{ ; and}$$

(e) comparator for comparing the first frequency ratio with at least one stored frequency ratio to obtain a similarity score.

47. An apparatus for determining a similarity between discrete portions of a continuous stream of wave data, the apparatus comprising:

(a) input device for receiving as the first input the continuous stream of wave data, the continuous stream of wave data further including a first plurality of time strips, with each of the first plurality of time strips including at least a first partial and a second partial, the continuous stream of wave data further including a second plurality of time strips, with each of the second plurality of time strips including at least a third partial and a fourth partial;

(b) first generator coupled to the output of the input device for generating a frequency ratio between the first partial and the second partial for each time strip of the predetermined spectral wave data according to the expression $$\frac{\text{frequency of the second partial}}{\text{frequency of the first partial}} \text{ ;}$$

(c) storage device for storing the frequency ratios for each time strip of the predetermined spectral wave data;

(d) second generator coupled to the output of the input device for generating a frequency ratio between the third partial and the fourth partial for each time strip of the spectral wave data according to the expression $$\frac{\text{frequency of the fourth partial}}{\text{frequency of the third partial}} \text{ ; and}$$

(e) comparator for comparing each frequency ratio associated with the second plurality of time strips with the stored frequency ratio of a predetermined time strip of the first plurality of time strips to obtain a similarity score for each time strip.

48. An apparatus for determining a similarity between wave data stored in a memory device and discrete portions of a continuous stream of wave data, the apparatus comprising:

(a) input device to receive as input the continuous stream of wave data;

(b) converter coupled to the output of the input device for generating a spectral time strip from the continuous stream of wave data using polynomial interpolation;

(c) extractor for extracting from the spectral time strip a plurality of identifying characteristics;

(d) storage device for storing wave data; and (e) comparator coupled to the output of the extractor and the storage device for comparing the plurality of identifying characteristics extracted by the extractor with the stored wave data to obtain a similarity score.

49. The apparatus of claim 48 wherein the stored wave data is extracted from the continuous stream of wave data.

* * * * *